US012255851B2

(12) United States Patent
Zillmann et al.

(10) Patent No.: US 12,255,851 B2
(45) Date of Patent: Mar. 18, 2025

(54) REDUCING CHANNEL INTERFERENCE WITH COMPLEX-VALUED ASYMMETRICAL WEIGHTED OVERLAP AND ADD FILTERING

(71) Applicant: QUALCOMM Incorporated, San Diego, CA (US)

(72) Inventors: Peter Zillmann, Nuremberg (DE); Andrea Garavaglia, Nuremberg (DE); Andreas Maximilian Schenk, Erlangen (DE); Pierpaolo Vallese, Nuremberg (DE); Saeed Afrasiabi Gorgani, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 402 days.

(21) Appl. No.: 17/805,493

(22) Filed: Jun. 6, 2022

(65) Prior Publication Data
US 2023/0396395 A1  Dec. 7, 2023

(51) Int. Cl.
*H04L 5/00* (2006.01)
(52) U.S. Cl.
CPC .......... *H04L 5/0073* (2013.01); *H04L 5/0064* (2013.01); *H04L 5/0069* (2013.01); *H04L 5/0098* (2013.01)

(58) Field of Classification Search
CPC ............................. H04L 5/0073; H04L 5/0098
See application file for complete search history.

(56) References Cited

U.S. PATENT DOCUMENTS

| | | | |
|---|---|---|---|
| 10,587,185 B1* | 3/2020 | Sridharan | H02P 5/74 |
| 2015/0349987 A1* | 12/2015 | Soriaga | H04L 25/03821 |
| | | | 375/295 |
| 2016/0323909 A1* | 11/2016 | Lin | H04W 72/1263 |
| 2020/0100326 A1* | 3/2020 | Bendlin | H04W 16/14 |
| 2021/0136550 A1* | 5/2021 | Schwartz | H02J 50/70 |

* cited by examiner

*Primary Examiner* — Michael A Keller
(74) *Attorney, Agent, or Firm* — Haynes & Boone

(57) ABSTRACT

Waveforms for wireless communication are shaped asymmetrically according to a complex-valued weighted overlap/add (WOLA) filter. A wireless communication device generates a waveform corresponding to a carrier. The device determines whether neighboring carriers are being used for wireless communication. If one neighboring carrier is occupied and the other is unoccupied, the wireless communication device applies the asymmetrical filter to the waveform such that out-of-band signals which may interfere with the occupied carrier are suppressed to a greater extent than out-of-band signals potentially present in or around the unoccupied carrier. The wireless communication device then transmits the asymmetrically shaped waveform to maximize interference reduction and signal quality.

30 Claims, 13 Drawing Sheets

REDUCING CHANNEL INTERFERENCE WITH COMPLEX-VALUED ASYMMETRICAL WEIGHTED OVERLAP AND ADD FILTERING

TECHNICAL FIELD

The present disclosure is directed to wireless communication systems and methods. Certain aspects of the present disclosure asymmetrically shape and/or filter waveforms to reduce interference of out-of-band signals.

INTRODUCTION

Wireless communications systems are widely deployed to provide various types of communication content such as voice, video, packet data, messaging, broadcast, and so on. These systems are capable of simultaneously supporting communication between multiple network units and multiple users in a single geographical area. Multiple different communications may occur simultaneously by assigning available resources (e.g., time and/or frequency) to different communications. Frequency resources may be designated as a range of frequencies (e.g., carrier, band, sub-band, etc.) assigned to one particular communication. While communication signals are intended to be bounded within the assigned frequency range, the communication signals may extend outside of the assigned frequency, including within one or more adjacent frequency ranges, which may be referred to as an out-of-band signal. Out-of-band signals can cause unwanted interference between communication signals. Therefore, there exists a need for improved systems, devices, and methods for shaping and/or filtering waveforms for communications between wireless devices.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to one aspect of the present disclosure, a method of wireless communication performed by a wireless communication device includes: generating a waveform in a first carrier, wherein the first carrier is between a second carrier and a third carrier; shaping the waveform asymmetrically such that the asymmetrically shaped waveform causes less interference with the second carrier than the third carrier; and transmitting the asymmetrically shaped waveform.

According to another aspect of the present disclosure, a method of wireless communication performed by a wireless communication device includes: receiving, from a second wireless communication device, a waveform in a first carrier, wherein the first carrier is between a second carrier and a third carrier; filtering the received waveform asymmetrically such that interference from the second carrier is filtered to a greater extent than interference from the third carrier; and processing the asymmetrically filtered waveform to obtain data associated with the waveform.

According to another aspect of the present disclosure, a wireless communication device includes: a transceiver; and a processor in communication with the transceiver, wherein the wireless communication device is configured to: generate a waveform in a first carrier, wherein the first carrier is between a second carrier and a third carrier; shape the waveform asymmetrically such that the asymmetrically shaped waveform causes less interference with the second carrier than the third carrier; and transmit the asymmetrically shaped waveform.

According to another aspect of the present disclosure, a wireless communication device includes a transceiver; and a processor in communication with the transceiver, wherein the wireless communication device is configured to: receive, from a second wireless communication device, a waveform in a first carrier, wherein the first carrier is between a second carrier and a third carrier; filter the received waveform asymmetrically such that interference from the second carrier is filtered to a greater extent than interference from the third carrier; and process the asymmetrically filtered waveform to obtain data associated with the waveform.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
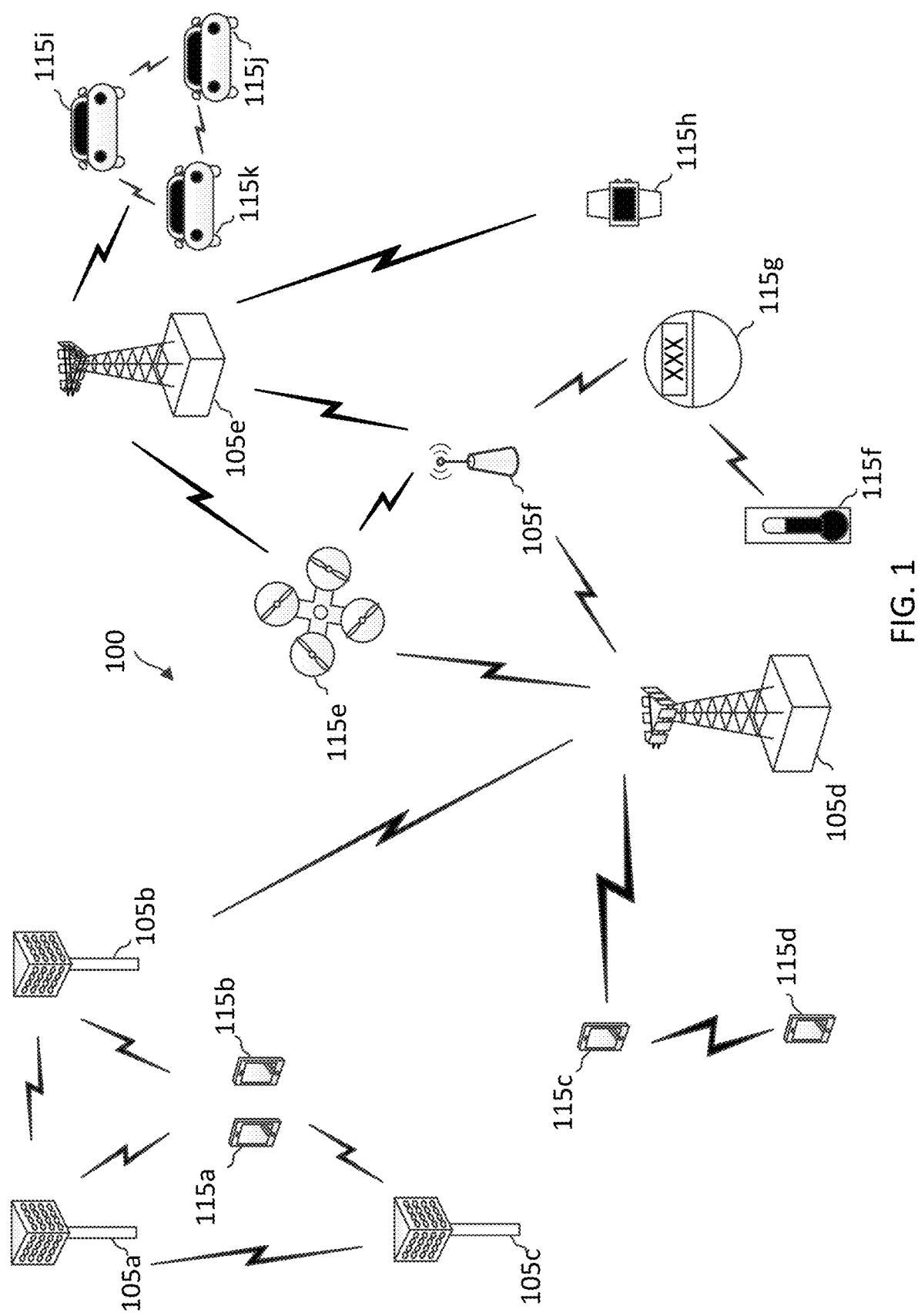
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof, and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In some wireless communication network scenarios, multiple wireless devices are in communication with each other simultaneously. These devices often include multiple user equipment devices (UEs) and/or one or more network units, including without limitation LTE or NR base stations (BSs), WiFi access points, or other network units of other radio access technologies (RATs). Multiple different communications may occur simultaneously by assigning available resources (e.g., time and/or frequency) to different communications. Frequency resources may be designated as a range of frequencies (e.g., carrier, band, sub-band, etc.) assigned to one particular communication. While communication signals are intended to be contained within the assigned frequency range, the communication signals may extend outside of the assigned frequency range, including within one or more adjacent frequency ranges. The portion of the communication signals that extend outside of an intended frequency range or frequency band may be referred to as an out-of-band signal. Out-of-band signals can cause unwanted interference between communication signals.

Interference between adjacent frequency ranges due to out-of-band signals may occur in a licensed spectrum, a shared spectrum, an unlicensed spectrum, other frequency ranges/spectrums, and/or combinations thereof. In some instances, one network unit, such as a NR base station (BS) may transmit data to a UE using a carrier defining a frequency range for the transmission. Another UE within the physical transmission range of the same BS may simultaneously transmit to or receive from another BS using another carrier of a different frequency range. If the two different carriers are used simultaneously, then interference may occur. The two interfering carriers may be adjacent to one another on the frequency spectrum, may be separated by a guard band, and/or separated by one or more additional carriers.

To reduce unwanted interference between communications, a transmitting wireless communication device may shape a waveform to reduce out-of-band signal strength. For example, a transmitting wireless device may apply a filter to the waveform before transmitting the waveform. The filter may reduce a power spectral density (PSD) of out-of-band regions of the waveform. In some examples, the filter applied may be symmetrical, in that the PSD of out-of-band regions on both sides of the waveform are suppressed equally. As explained herein, however, in communication scenarios in which interference or potential interference is detected on only one side of the waveform, an asymmetrical filter may more effectively suppress out-of-band interference where it is needed most. Similarly, a receiving wireless device may apply a filter (e.g., a symmetrical or asymmetrical filter) to a received waveform to reduce out-of-band interference. The filter may remove and/or reduce out-of-band regions of the received waveform. The receiving wireless device may apply the filter prior to processing the waveform.

In some scenarios, a carrier may be selected for a communication. A wireless communication device participating in the communication may also determine whether any nearby carriers are occupied or scheduled for a different communication. If the wireless communication device determines that another carrier is occupied, then the wireless communication device may select and/or alter the filter to be applied to the waveform to be transmitted accordingly. For example, the wireless communication device may determine that a higher carrier neighboring the carrier to be used for the communication is occupied and that a lower carrier neighboring the carrier to be used for the communication is unoccupied. In this scenario, the wireless communication device may apply an asymmetrical filter to the waveform such that an out-of-band signal is suppressed to a greater extent on the higher frequency side than lower frequency side. In other scenarios, the wireless communication device may apply an asymmetrical filter to the waveform such that an out-of-band signal is suppressed to a greater extent on the lower frequency side than higher frequency side.

The asymmetrical filter may be a complex-valued weighted overlap/add (WOLA) filter. An asymmetrical WOLA filter may suppress out-of-band signals on one side of a carrier (e.g., higher frequencies or lower frequencies) more than the other side of the carrier (e.g., lower frequencies or higher frequencies). In the situation described above, in which one neighboring carrier (e.g., a higher frequency carrier or a lower frequency carrier) is occupied and the other neighboring carrier (e.g., a lower frequency carrier or a higher frequency carrier) is not occupied, the wireless communication device may determine that an asymmetrical WOLA filter should be applied that more aggressively suppresses out-of-band signals on the side of the carrier corresponding to the occupied neighboring carrier more than the side of the unoccupied neighboring carrier.

In some instances, the asymmetrical shaping and/or filtering techniques of the present disclosure reduce interference between communications. In this regard, the asymmetrical shaping and/or filtering techniques of the present disclosure may reduce interference between communications to a greater extent and/or more effectively that symmetrical shaping and/or filtering techniques. In addition, asymmetrical shaping and/or filtering may increase signal strength (e.g., SNR SINR, PSD, etc.) of wireless communications, increase network throughput, improve utilization of network resources, improve network efficiency, reduce power consumption, and/or reduce processing.

FIG. 1 illustrates a wireless communication network 100 according to some aspects of the present disclosure. The network 100 may be a 5G network. The network 100 includes a number of network units 105 (individually labeled as 105a, 105b, 105c, 105d, 105e, and 105f) and other network entities. A network unit 105 may be a station that communicates with UEs 115 and may include an evolved node network unit (eNB), a next generation eNB (gNB), one or more components of a disaggregated base station architecture (e.g., a central unit (CU), a distributed unit (DU), and/or a radio unit (RU)), an access point, a transmission-reception point (TRP), any other base station, and/or the like. Each network unit 105 may provide communication coverage for a particular geographic area. In 3GPP, the term "cell" can refer to this particular geographic coverage area of a network unit 105 and/or a network unit subsystem serving the coverage area, depending on the context in which the term is used.

A network unit 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A network unit for a macro cell may be referred to as a macro network unit. A network unit for a small cell may be referred to as a small cell network unit, a pico network unit, a femto network unit or a home network unit. In the example shown in FIG. 1, the network units 105d and 105e may be regular macro network units, while the network units 105a-105c may be macro network units enabled with one of three dimension (3D), full dimension (FD), or massive MIMO. The network units 105a-105c may take advantage of their higher dimension MIMO capabilities to exploit 3D beamforming in both elevation and azimuth beamforming to increase coverage and capacity. The network unit 105f may be a small cell network unit which may be a home node or portable access point. A network unit 105 may support one or multiple (e.g., two, three, four, and the like) cells.

The network 100 may support synchronous or asynchronous operation. For synchronous operation, the network units may have similar frame timing, and transmissions from different network units may be approximately aligned in time. For asynchronous operation, the network units may have different frame timing, and transmissions from different network units may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the network units, whether macro BS, small cell, or the like. In FIG. 1, a lightning bolt (e.g., communication links) indicates wireless transmissions between a UE 115 and a serving network unit 105, which is a network unit designated to serve the UE 115 on the downlink (DL) and/or uplink (UL), desired transmission between network units 105, backhaul transmissions between network units, or sidelink transmissions between UEs 115.

In operation, the network units 105a-105c may serve the UEs 115a and 115b using 3D beamforming and coordinated spatial techniques, such as coordinated multipoint (CoMP) or multi-connectivity. The macro network unit 105d may perform backhaul communications with the network units 105a-105c, as well as small cell, the network unit 105f. The macro network unit 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network units 105 may also communicate with a core network. The core network may provide user authentication, access authorization, tracking, Internet Protocol (IP) connectivity, and other access, routing, or mobility functions. At least some of the network units 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the network units 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro network units 105d and 105e, as well as links from the small cell network unit 105f. Other machine type devices, such as the UE 115f (e.g., a thermometer), the UE 115g (e.g., smart meter), and UE 115h (e.g., wearable device) may communicate through the network 100 either directly with network units, such as the small cell network unit 105f, and the macro network unit 105e, or in multi-step-size configurations by communicating with another user device which relays its information to the network, such as the UE 115f communicating temperature measurement information to the smart meter, the UE 115g, which is then reported to the network through the small cell network unit 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a network unit 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the network units 105 can assign or schedule transmission resources (e.g., in the form of time-frequency resource blocks (RB)) for downlink (DL) and uplink (UL) transmissions in the network 100. DL refers to the transmission direction from a network unit 105 to a UE 115, whereas UL refers to the transmission direction from a UE 115 to a network unit 105. The communication can be in the form of radio frames. A radio frame may be divided into a plurality of subframes or slots, for example, about 10. Each slot may be further divided into mini-slots as will be discussed more fully below in relation to FIG. 2. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the network units 105 and the UEs 115. For example, a reference signal can have a particular pilot pattern or structure, where pilot tones may span across an operational BW or frequency band, each positioned at a pre-defined time and a pre-defined frequency. For example, a network unit 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a network unit 105 to estimate a UL channel. Control information may include resource assignments and protocol controls. Data may include protocol data and/or operational data. In some aspects, the network units 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The network units 105 can transmit synchronization signals (e.g., including a primary synchronization signal (PSS) and a secondary synchronization signal (SSS)) in the network 100 to facilitate synchronization. The network units 105 can broadcast system information associated with the network 100 (e.g., including a master information block (MIB), remaining system information (RMSI), and other system information (OSI)) to facilitate initial network access. In some instances, the network units 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a network unit 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the network unit 105. In some aspects, the random access procedure may be a four-step random access procedure. For example, the UE 115 may transmit a random access preamble and the network unit 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the network unit 105 and the network unit 105 may respond with a connection response. The connection response may indicate a contention resolution. In some aspects, the random access preamble, the RAR, the connection request, and the connection response can be referred to as message 1 (MSG1), message 2 (MSG2), message 3 (MSG3), and message 4 (MSG4), respectively. In some aspects, the random access procedure may be a two-step random access procedure, where the UE 115 may transmit a random access preamble and a connection request in a single transmission and the network unit 105 may respond by transmitting a random access response and a connection response in a single transmission.

After establishing a connection, the UE 115 may initiate an initial network attachment procedure with the network 100. When the UE 115 has no active data communication with the network unit 105 after the network attachment, the UE 115 may return to an idle state (e.g., RRC idle mode). Alternatively, the UE 115 and the network unit 105 can enter an operational state or active state, where operational data may be exchanged (e.g., RRC connected mode). For example, the network unit 105 may schedule the UE 115 for UL and/or DL communications. The network unit 105 may transmit UL and/or DL scheduling grants to the UE 115 via a PDCCH. The scheduling grants may be transmitted in the form of DL control information (DCI). The network unit 105 may transmit a DL communication signal (e.g., carrying data) to the UE 115 via a PDSCH according to a DL scheduling grant. The UE 115 may transmit a UL communication signal to the network unit 105 via a PUSCH and/or PUCCH according to a UL scheduling grant.

In some aspects, the network unit 105 may communicate with a UE 115 using HARQ techniques to improve communication reliability, for example, to provide a URLLC service. The network unit 105 may schedule a UE 115 for a PDSCH communication by transmitting a DL grant in a PDCCH. The network unit 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the network unit 105. Conversely, if the UE 115 fails to receive the DL transmission successfully, the UE 115 may transmit a HARQ NACK to the network unit 105. Upon receiving a HARQ NACK from the UE 115, the network unit 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The network unit 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A network unit 105 may dynamically assign a UE 115 to operate over a certain BWP (e.g., a certain portion of the system BW). The assigned BWP may be referred to as the active BWP. The UE 115 may monitor the active BWP for signaling information from the network unit 105. The network unit 105 may schedule the UE 115 for UL or DL communications in the active BWP. In some aspects, a network unit 105 may assign a pair of BWPs within the CC to a UE 115 for UL and DL communications. For example, the BWP pair may include one BWP for UL communications and one BWP for DL communications.

In some aspects, the network unit 105 may transmit a PRACH configuration to the UE 115. The PRACH configuration may indicate a set of ROs in the PRACH configuration. The network unit 105 and/or the UE 115 may divide ROs into different groups, including a first group of ROs configured for PRACH repetitions, and a second group configured for single PRACH transmissions.

Figure 2:
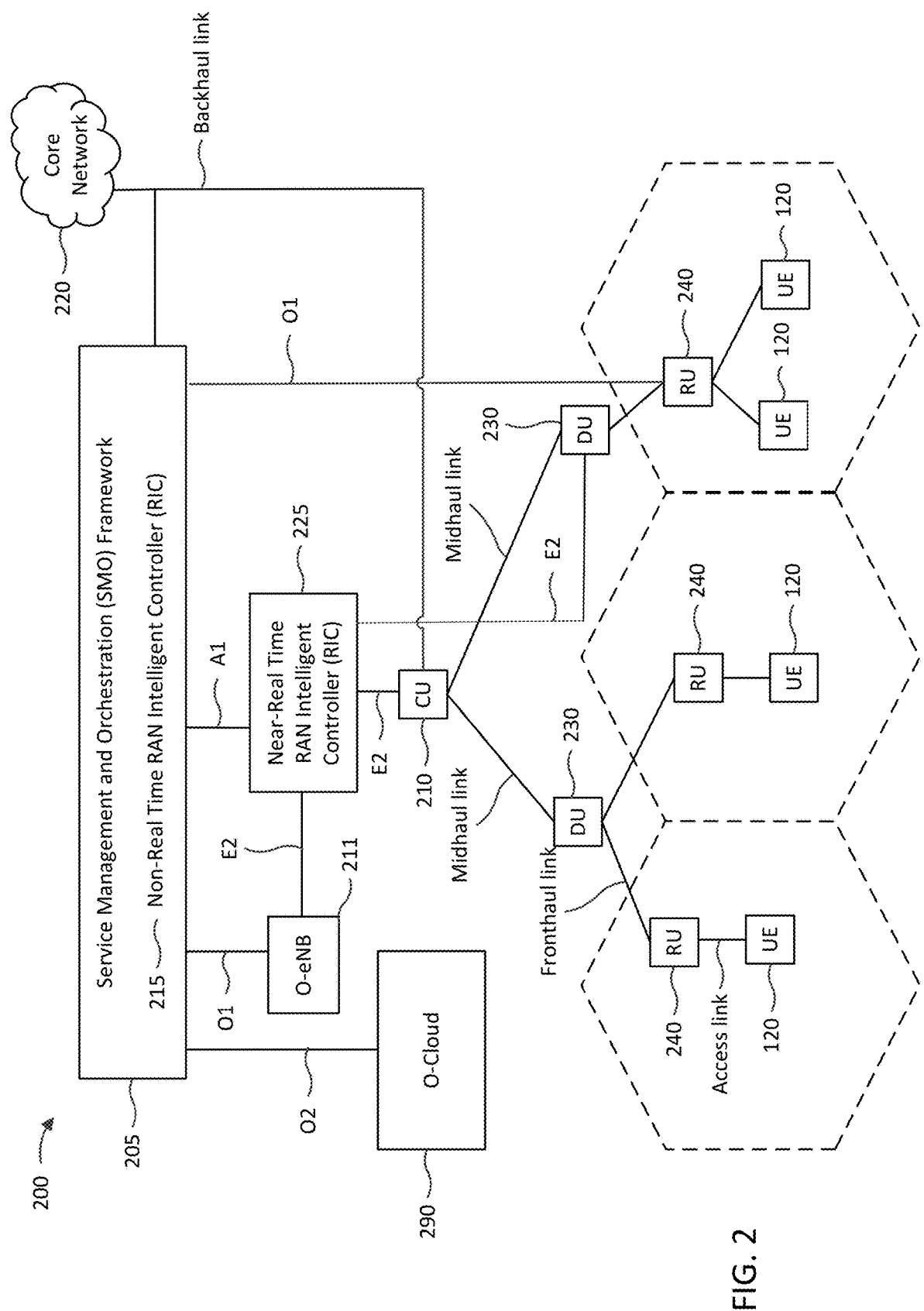
FIG. 2 is a diagram illustrating an example disaggregated BS architecture according to some aspects of the present disclosure.

FIG. 2 shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 120 via one or more radio frequency (RF) access links. In some implementations, the UE 120 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit—User Plane (CU-UP)), control plane functionality (i.e., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 120. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some aspects, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
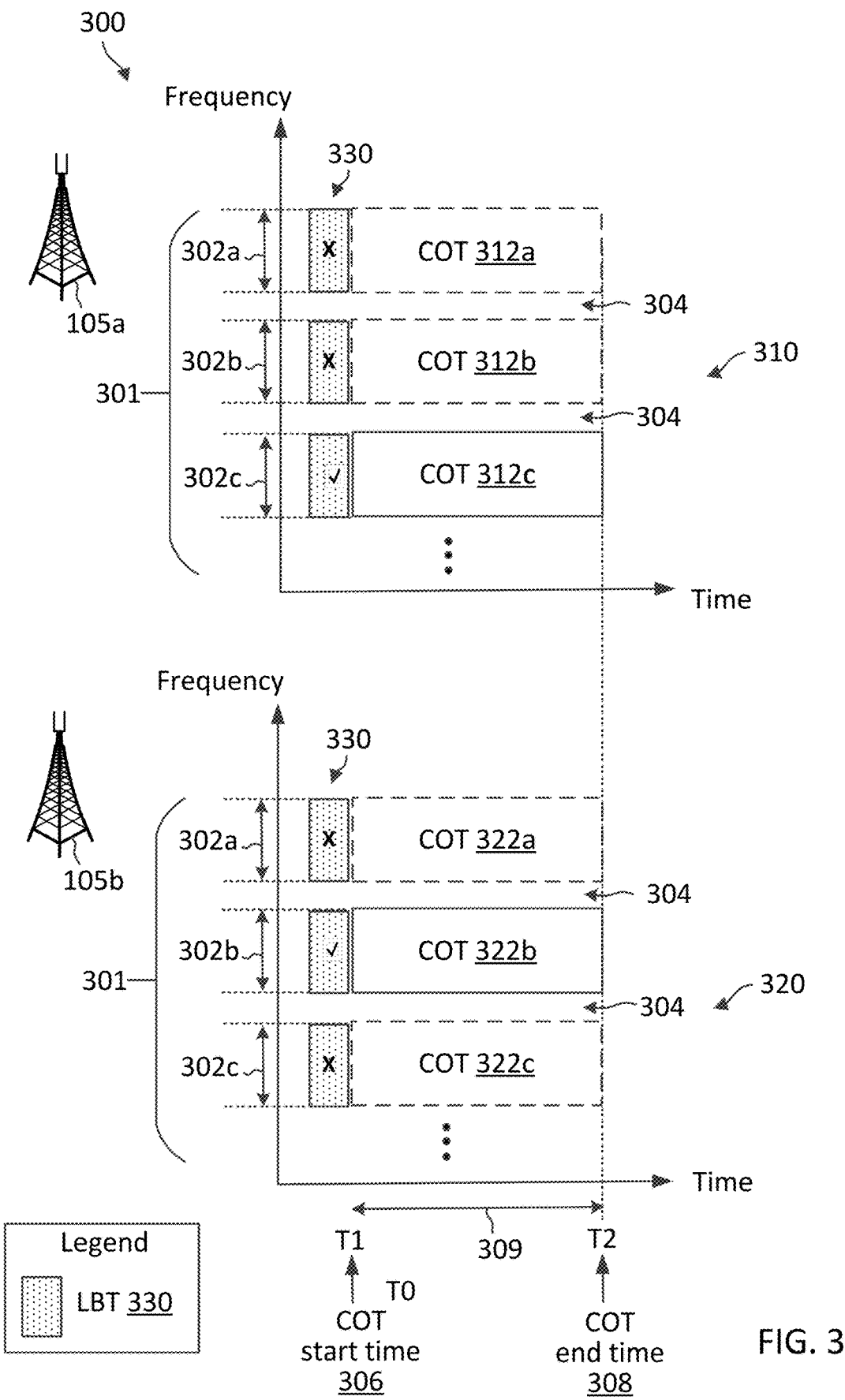
FIG. 3 illustrates a wireless communication scheme according to some aspects of the present disclosure.

FIG. 3 illustrates a wireless communication transmission scheme 300 according to some aspects of the present disclosure. In some aspects, FIG. 3 may illustrate ways in which any wireless communication device described herein may select a carrier for communication as well as whether nearby carriers, such as neighboring carriers, are occupied or unoccupied. As shown in FIG. 3, the wireless communication devices may be network units 105, such as those described above in the context of FIGS. 1 and 2. However, the wireless communication devices may be any suitable type of wireless communication device, including, for example, UEs, multi transmission reception points (TRPs), or any other devices. As will be explained in more detail hereafter, the wireless communication devices may shape a waveform to be transmitted and/or filter a received waveform to reduce interference. In some instances, the wireless communication devices may determine whether to shape and/or filter the waveform based on whether adjacent carrier(s) are used for communications or are not.

The wireless communication transmission scheme 300 may be employed by network units 105a and 105b (e.g., the network units 105 in the network 100). In particular, the network units 105a and 105b may acquire channel occupancy times (COTs) in a shared radio frequency band (e.g., in a shared spectrum or an unlicensed spectrum) for communications with a UE as shown in the wireless communication transmission scheme 300. In FIG. 3, the x-axes represent time in some arbitrary units, and the y-axes represent frequency in some arbitrary units.

In the wireless communication transmission scheme 300, a shared radio frequency band 301 is partitioned into a plurality of LBT subbands 302 (shown as 302a, 302b, 302c, ...). The LBT subbands 302 may be spaced apart from each other by a guard band 304. The guard bands 304 can mitigate adjacent band interference between adjacent LBT subbands 302. The frequency band 301 may be at any suitable frequencies (e.g., at about 2.4 GHz, 5 GHz, 6 GHz, 10 GHz, 30 GHz, 60 GHz or higher). The frequency band 301 may correspond to any suitable bandwidth (e.g., 20 MHz, 40 MHz, 80 MHz, 100 MHz or more). In some aspects, the frequency band 301 may have a bandwidth of about 100 MHz and may be partitioned into about 5 LBT subbands 302 each having a bandwidth of about 20 MHz. In some aspects, the frequency band 301 may have a bandwidth of about 20 MHz and may be partitioned into about 5 LBT subbands 302 each having a bandwidth of about 5 MHz. The frequency band 301 may be shared by multiple network operating entities of the same radio access technologies (RATs) or different RATs. For instance, the frequency band 301 may be shared by NR-U, IEEE 802.11 wireless local area network (WLAN) or WiFi, and/or license assisted access (LAA).

In the illustrated example of FIG. 3, a network unit 105a and a network unit 105b may perform LBTs 330. The network units 105a and 105b may perform the LBTs 330 simultaneously or at different times. The COT acquisition by the network unit 105a is shown by the reference numeral 310. In some aspects, the network unit 105a may perform an LBT 330 at a particular time in each LBT subband 302a, 302b, and 302c simultaneously (or over a time period) to contend for a COT 312 in each respective LBT subband. The LBTs 330 can be based on channel energy detection and/or signal detection as discussed above. The LBT 330 in the LBT subband 302c may be successful (shown by the checkmark). Thus, the network unit 105a may successfully acquire the COT 312c in LBT subband 302c. However, the LBTs 330 in the LBT subband 302a and the LBT subband 302b may fail (shown by the x symbol). Thus, the network unit 105a may fail to acquire the COT 312a and the COT 312b in the LBT subband 302a and the LBT subband 302b, respectively (as shown by the dashed outlined boxes).

The COT acquisition by the network unit 105b is shown by the reference numeral 320. In some aspects, the network unit 105b may perform an LBT 330 at some time before, after, or simultaneously with the network unit 105a described previously. The network unit 105b may perform an LBT 330 in each LBT subband 302a, 302b, and 302c simultaneously (or over a time period) to contend for a COT 322 in each respective LBT subband. The LBT 330 in the LBT subband 302b may be successful (shown by the checkmark). Thus, the network unit 105b may successfully acquire the COT 322b in LBT subband 302b. However, the LBTs 330 in the LBT subband 302a and the LBT subband 302c may fail (shown by the x symbol). Thus, the network unit 105b may fail to acquire the COT 312a and the COT 312c in the LBT subband 302a and the LBT subband 302c, respectively (as shown by the dashed outlined boxes).

Each COT described herein may correspond to a starting time and an ending time and may be of a specified duration. For example, as can be seen in FIG. 3, the COT 322b acquired by the network unit 105b may have a COT starting time 306 (e.g., time T1) and a COT duration 309 that ends at a COT ending time 308 (e.g., time T2). The COT 312c acquired by the network unit 105a may have a similar duration, including starting and ending at the same times T1 and T2, or may correspond to a different duration, including starting and/or ending before or after any of the times of the COT 322b.

Figure 4:
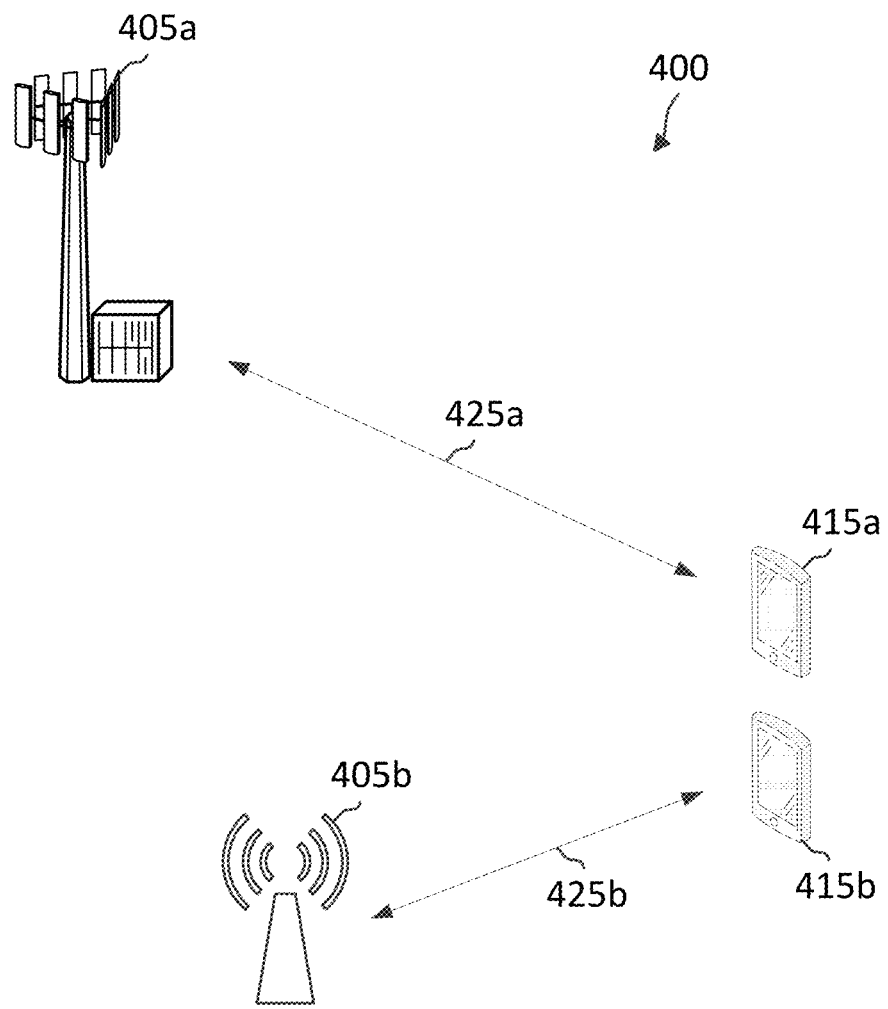
FIG. 4 illustrates a communication scenario involving multiple radio access technologies (RATs) according to some aspects of the present disclosure.

FIG. 4 illustrates a communication scenario 400 involving multiple different types of radio access technologies (RATs) according to some aspects of the present disclosure. In the communication scenario 400, a network unit 405a may communicate with a UE 415a and a network unit 405b may communicate with a UE 415b. For example, the network unit 405a may send a communication 425a to the UE 415a or receive the communication 425a from the UE 415a. Similarly, the network unit 405b may send a communication 425b to the UE 415b or receive the communication 425b from the UE 415b. In some instances, the network unit 405a and the network unit 405b may correspond to different types of RATs. For instance, the network unit 405a may be a base station (or one or more components of a base station) corresponding to an LTE or NR network unit and the network unit 405b may be a WiFi access point. In other scenarios, however, the network units 405a and 405b may be any type of network unit corresponding to any type of RAT.

In the scenario shown in FIG. 4, the UEs 415a and 415b may be positioned in relation to one another such that both UEs 415a and 415b are within a transmission range of the network unit 405a and the transmission range of the network unit 405b. As a result, both the UEs 415a and 415b may be capable of receiving data from and/or transmitting data to the network unit 405a and/or the network unit 405b. In this regard, the UE 415a and/or 415b may be in communication with both the network unit 405a and the network unit 405b in some instances. It is noted that additional UEs and/or network units may be included in the communication scenario described with reference to FIG. 4. For example, additional UEs may be within the range of and/or communicating with the network unit 405a and/or the network unit 405b. In addition, additional network units of the same or different types may be included in the communication scenario 400 that may communicate with the UEs 415a and/or 415b as well as any other additional UEs and/or the network units 405a and/or 405b as well as any other additional network units. For the purposes of simplicity, however, only two network units and two UEs are shown and described with reference to FIG. 4. However, the principles described herein may apply similarly to scenarios with additional network units and/or UEs.

In some instances, the communication scenario 400 may include communications over an unlicensed spectrum or shared spectrum. For example, to facilitate communication of data (e.g., communication 425a and/or 425b), the network units 405a, 405b and/or UEs 415a, 415b may identify and/or select time and frequency resources for the communications 425a and/or 425b. Any suitable technique for identifying the time and frequency resources for the communications 425a and/or 425b may be used, including without example any principles, methods, steps, or processes described herein (e.g., with reference to FIGS. 3, 8, and/or 11). For example, any of the devices shown in FIG. 4 may perform various listen-before-talk (LBT) procedures and/or clear channel assessment (CCA) procedures to identify a clear channel for communication. In this scenario, the network units 405a/405b and/or the UEs 415a/415b may select one or more carriers for the communications 425a/425b based on the LBT and/or CCA procedures. The carrier(s) may include a particular frequency band or a range of frequency bands, which may be contiguous frequency bands or interlaced frequency bands.

In some instances, the carrier(s) associated with the communication 425a may be adjacent to the carrier(s) associated with the communication 425b in frequency. In some instances, the adjacent carriers may be separated by a guard band and/or by one or more additional carriers. In some instances, if the network unit 405a or the UE 415a transmits communication 425a at the same time that the network unit 405b or the UE 415b transmits communication 425b, interference between the transmitted signals may occur. For example, portions of a waveform of communication 425a may occupy the same regions of the frequency spectrum as portions of a waveform of communication 425b. As will be explained in more detail herein, any of the devices shown and/or described with reference to FIG. 4 may transmit or receive waveforms. In one aspect, a transmitting wireless communication device may apply various filters or other data processing techniques to a waveform before transmitting the waveform to mitigate interference with other waveforms of adjacent or nearby carriers. In another aspect, a receiving wireless communication device may apply various filters or other data processing techniques to a waveform after receiving the waveform to mitigate interference with other waveforms of adjacent or nearby carriers. These filters or techniques may include weighted overlap and add (WOLA) filters, including symmetrical WOLA filters, asymmetrical or complex-valued WOLA filters, and/or any other type of method for mitigating interference, including combinations thereof.

Figure 5:
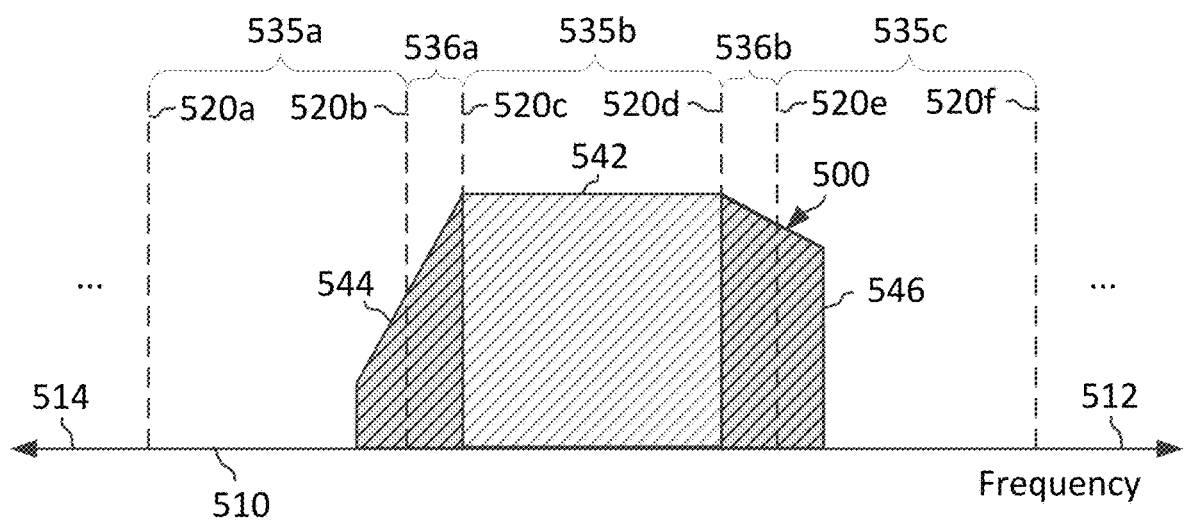
FIG. 5 is a diagrammatic view of a waveform according to some aspects of the present disclosure.

FIG. 5 is a diagrammatic view of a waveform 500 according to some aspects of the present disclosure. The waveform 500 may be an asymmetrical waveform transmitted between two wireless communication devices, such as any of the network units and/or UEs described herein. FIG. 5 illustrates a frequency spectrum 510. The direction 512 may correspond to an increase in frequency while the direction 514 may correspond to a decrease in frequency. The frequency spectrum 510 may be divided into multiple carriers 535 (e.g., 535a, 535b, 535c, etc.). A carrier 535 may correspond to a range of contiguous frequencies along the spectrum 510. The spacing of the carriers 535 may be based on any suitable numerology. In some instances, the carriers 535 have a subcarrier spacing of 15 kHz, 30 kHz, 60 kHz, 120 kHz, 240 kHz, or other suitable spacing. In some instances, each carrier 535 may be separated from an immediately adjacent carrier 535 by a guard band 536, as shown (e.g., carrier 535a is separated from carrier 535b by guard band 536a). In the scenario illustrated by FIG. 5, three carriers (carrier 535a, carrier 535b, and carrier 535c) are shown, but it is understood that the concepts described herein are applicable to any number of carriers over the available frequency range of a network. The frequency range corresponding to the carrier 535a may be generally identified by lines 520a and 520b. The frequency range corresponding to the carrier 535b may generally be identified by lines 520c and 520d. The frequency range corresponding to the carrier 535c may be identified by lines 520e and 520f. One or more of the carriers 535a, 535b, and/or 535c may be occupied by a waveform (e.g., waveform 500) and used to transmit a communication wirelessly between devices. As also shown in FIG. 5, a guard band 536a is between the carriers 535a and 535b and a guard band 536b is between the carriers 535b and 535c. In some instances, guard bands 536 may be between adjacent carriers to mitigate interference between adjacent carriers.

The waveform 500 may include user data, control information, reference signals, signal reports, uplink communications, downlink communications, sidelink communications, and/or any other type of communications. The waveform 500 may occupy any suitable time and/or frequency resources. In FIG. 5, the waveform 500 may be intended to occupy the carrier 535b. The waveform 500 may include a region 542, a region 544, and a region 546. The region 542 may correspond to a portion of the waveform 500 within the frequency range of the carrier 535b. In other words, the region 542 may correspond to a portion of the waveform between the lines 520c and 520d. The region 544 may correspond to a portion of the waveform 500 that is outside of the frequency range of the carrier 535b in the direction of lower frequencies. In other words, the region 544 may correspond to an out-of-band portion of the waveform 500 extending beyond the line 520c. The region 546 may correspond to a portion of the waveform 500 that is outside of the frequency range of the carrier 535b in the direction of higher frequencies. In other words, the region 546 may correspond to an out-of-band portion of the waveform 500 extending beyond the line 520d. As shown in FIG. 5, although the waveform 500 occupies the carrier 535b, portions of the waveform 500 may occupy parts of the frequency spectrum 510 outside the carrier 535b. For example, the region 544 may extend beyond the carrier 535b and into the guard band 536a and/or the carrier 535a. Similarly, the region 546 may extend beyond the carrier 535b and into the guard band 536b and/or the carrier 535c.

As shown in FIG. 5, the waveform 500 may be shaped asymmetrically in accordance with the present disclosure. For example, a transmitting device (e.g., network unit or UE) may apply an asymmetrical WOLA filter to the waveform 500 to suppress power spectral density of the waveform 500 outside the frequency range of the carrier 535b (e.g., regions 544 and 546 of the waveform 500). A transmitting device may apply an asymmetrical WOLA filter before transmitting the waveform. In some aspects, a receiving device may apply an asymmetrical WOLA filter to a waveform after receiving the waveform. In some instances, the received waveform may be a symmetrically transmitted waveform and the application of the asymmetrical WOLA filter by the receiving device may filter out-of-band interference asymmetrically (e.g., as shown by the waveform 500). In some instances, the received waveform may be an asymmetrically shaped waveform (e.g., similar to waveform 500) and the application of the asymmetrical WOLA filter by the receiving device may further asymmetrically filter out-of-band interference.

Referring to the waveform 500, applying an asymmetrical WOLA filter to the waveform 500 will suppress the power spectral density of the waveform 500 towards either of the carriers 535a or 535c. In the example shown, the power spectral density of the region 544 (e.g., toward the carrier 535a) of the waveform 500 is suppressed more greatly than the power spectral density of the region 546 (e.g., toward the carrier 535c). In this regard, the WOLA filter applied may be configured to suppress the power spectral density within the carrier 535a and/or the guard band 536a to a greater extent than the power spectral density within the carrier 535c and/or the guard band 536b. In some scenarios, the power spectral density of the region 546 may be suppressed to a greater extent than the power spectral density of the region 544.

In some aspects, the degree of suppression of out-of-band signals (e.g., the regions 544 and/or 546) may depend on the frequency of the signal and/or the distance of out-of-band signals along the frequency scale 510 from the intended carrier of the waveform (e.g., the carrier 535b). For example, greater suppression may be applied to out-of-band signals farther outside of the frequency range of the carrier 535b. This varying degree of suppression may have a linear and/or non-linear relationship with the distance outside the carrier 535b frequency range. The asymmetric WOLA filter may be applied to a waveform by a transmitting wireless communication device before transmission and/or by a receiving communication device after reception of transmitted data.

In some aspects, to determine which side of a waveform is to be suppressed to a greater extent than the other, a wireless communication device may perform a clear channel assessment (CCA), which may include an LBT, a CAT2 LBT, a CAT3 LBT, a CAT4 LBT, or otherwise. The CCA may be performed in a shared spectrum and/or a unlicensed spectrum. By performing the CCA, the wireless communication device may determine whether neighboring or nearby carriers are being utilized by another network and/or wireless communication device. For example, with respect to FIG. 5, the wireless communication device may determine whether the carrier 535a and/or the carrier 535c is occupied. Based on the CCA (e.g., detection of waveforms and/or other indications of use in these or other carriers), the wireless communication device may determine to apply an asymmetric WOLA filter to suppress out-of-band signals toward a neighboring occupied carrier. For example, the waveform 500 of FIG. 5 may be asymmetrically shaped so as to avoid interference with a waveform occupying the carrier 535a to a greater extent than a waveform occupying the carrier 535c. In this way, the wireless communication device may shape the waveform asymmetrically based on the CCA. Additional aspects of shaping a waveform based on the presence of waveforms in nearby carriers will be described with reference to FIG. 7A-7D.

Figure 6:
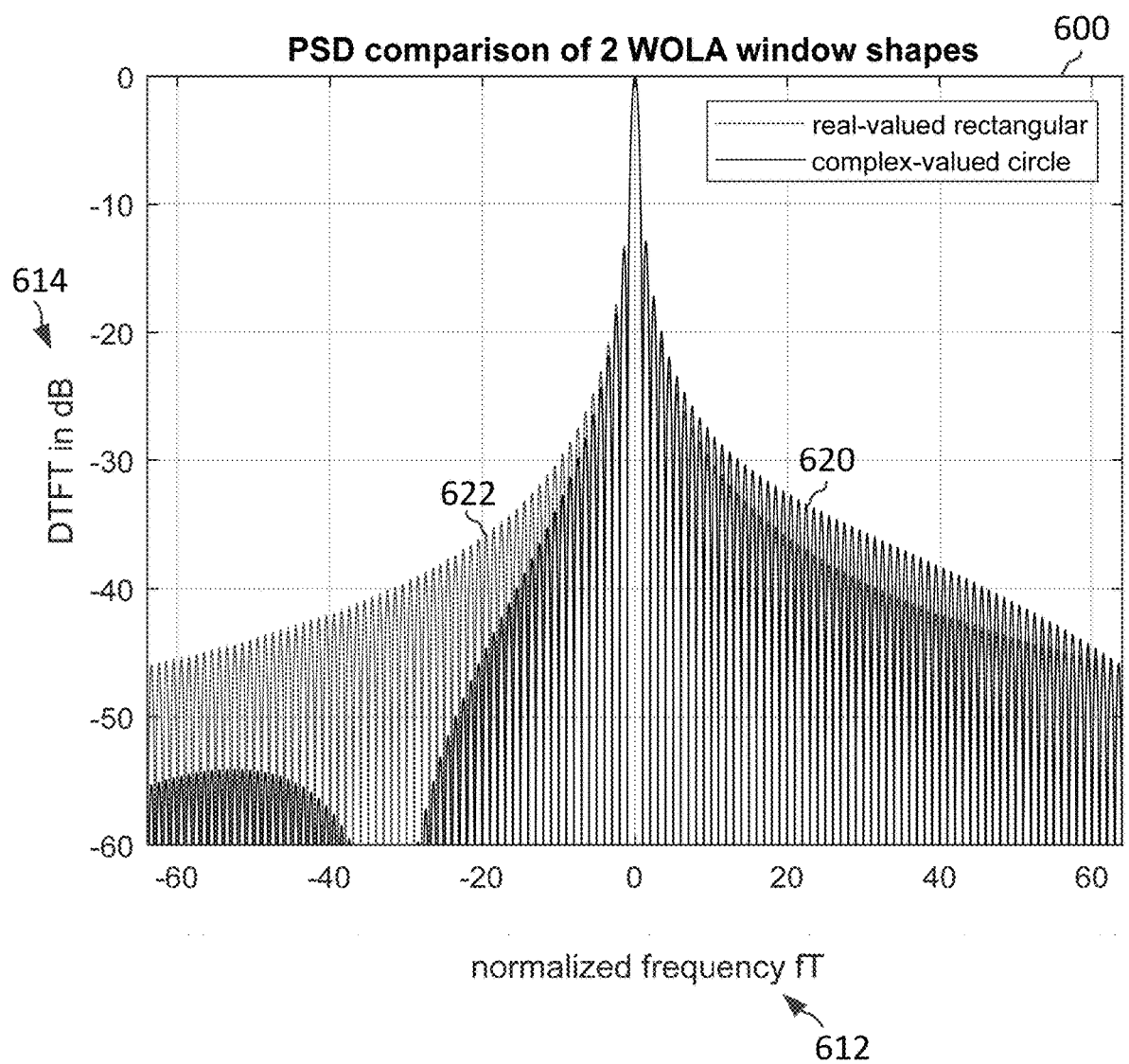
FIG. 6 is a comparison of a power spectral density (PSD) of a symmetrical weighted overlap and add (WOLA) shape and a PSD of an asymmetrical WOLA shape according to some aspects of the present disclosure.

FIG. 6 is a comparison of a power spectral density (PSD) of a symmetrical weighted overlap and add (WOLA) shape and a PSD of an asymmetrical WOLA shape according to some aspects of the present disclosure. FIG. 6 includes a plot 600 illustrating a relationship between power spectral density and frequency. As shown, the plot 600 includes a frequency scale 612, a power spectral density scale 614, a PSD plot 620 associated with an asymmetrical WOLA filter (e.g., a complex-valued circular WOLA filter), and a PSD plot 622 associated with a symmetrical WOLA filter (e.g., a real-valued rectangular WOLA filter).

The plot 600 illustrates a reduction in power spectral density to a waveform by applying two different WOLA filters. A WOLA filter may define a transition from 0 to 1 and aspects of a WOLA filter may be implemented to suppress out-of-band signals. By generalizing a WOLA filter to 2-dimensional (e.g., complex-valued) pulse shapes, asymmetrical suppression of out-of-band signals may be achieved. The calculation and/or generation of a WOLA filter may be based on a complex circle pulse. For example, a WOLA filter may be based on a mathematical relationship between attenuation of a signal with the frequency of the signal, as shown by plot 600. In some instances, the WOLA filter applied by the wireless communication device may be based on Equation 1.

$$w(n) = [1 + e^{j\pi(n/N-1)}]/2 \qquad \text{Equation 1:}$$

In regard to equation 1, w may correspond to a filter or pulse shape and may be defined in a time domain, n may correspond to a frequency value, and N may correspond to an integer. N may correspond to a one-sided length of a window in units of samples. In some examples, N corresponds to a fraction (e.g., 1/5, 1/6, 1/8, 1/10, 1/14, 1/20, or any other suitable fraction) or percentage (e.g., 5%, 10,%, 15%, 20%, or any other suitable percentage) of the OFDM cyclic prefix length. In some instances, the WOLA filter applied by the wireless communication device may be based on Equation 2.

$$w(n) = \frac{1}{2} + \frac{1}{4a}\left[(a+b)e^{j\pi(n/N-1)} + (a-b)e^{-j\pi(n/N-1)}\right] \qquad \text{Equation 2}$$

In regard to equation 2, n may be a value equal to or between 0 and N, and a and b may be complex numbers. In some instances, a and b are not equal to each other. In some instances, a and b are equal to each other, but not equal to 1. In other instances, the WOLA filter applied may be based on any other suitable equation or relationship. In some instances, in selecting the WOLA filter, the 2nd Nyquist criterion may be fulfilled. In this case, rising and falling WOLA slopes can add to unity. In some aspects, inter-carrier interference (ICI) free transmission and/or reception is possible. In some instances (e.g., if power spectral density characteristics are more important than ICI-free OFDM transmission and/or reception), the 2nd Nyquist criterion may be lifted.

As shown in FIG. 6, the power spectral density scale 614 may illustrate the power spectral density in decibels (dB) such that no repression of power spectral density corresponds to a value of 0 on the scale 614, and repression of power spectral density corresponds to a negative dB value. The power spectral density may be a discrete-time Fourier transform. The frequency scale 612 may illustrate the frequency relative to a central frequency (e.g., 0).

The PSD plot 622 shown in the plot 600 may correspond to a real-valued symmetrical WOLA filter. As shown in the plot 600, a real-valued WOLA filter may suppress the power spectral density equally or symmetrically on either side of the central frequency. As a result, by applying a real-valued WOLA filter to a waveform, out-of-band frequencies on either side of the waveform may be suppressed equally. In some instances, a real-valued WOLA filter may be referred to as a real-valued rectangular WOLA filter.

The PSD plot 620 shown in the plot 600 may correspond to a complex-valued asymmetrical WOLA filter. As shown, an asymmetrical WOLA filter may suppress power spectral density differently on different sides of the central frequency. Specifically, in the example shown in FIG. 6, power spectral density to the left of the central frequency, or frequencies that are less than the central frequency as shown by the region 632 may be suppressed to a greater extent than frequencies to the right of the central frequency, or frequencies that are greater than the central frequency shown by the region 630.

The plot 600 shows that the PSD plot 620 after the application of an asymmetrical WOLA filter is significantly less than the PSD plot 622 after application of a symmetrical WOLA filter for frequencies lower than the central frequency of 0. This suppression may be advantageous in more effectively reducing interference with waveforms in carriers of frequencies that are less than the frequency of a particular carrier. However, the PSD plot 620 related to the asymmetrical WOLA filter is higher than the PSD plot 622 related to the symmetrical WOLA filter for frequencies above the central frequency 0. This may mean that the asymmetrical WOLA filter will not as effectively reduce interference with waveforms in carriers of frequencies that are greater than the frequency of the particular carrier. It is also noted that a complex-valued WOLA filter may be referred to as a complex-valued circular WOLA filter.

Figure 7A:
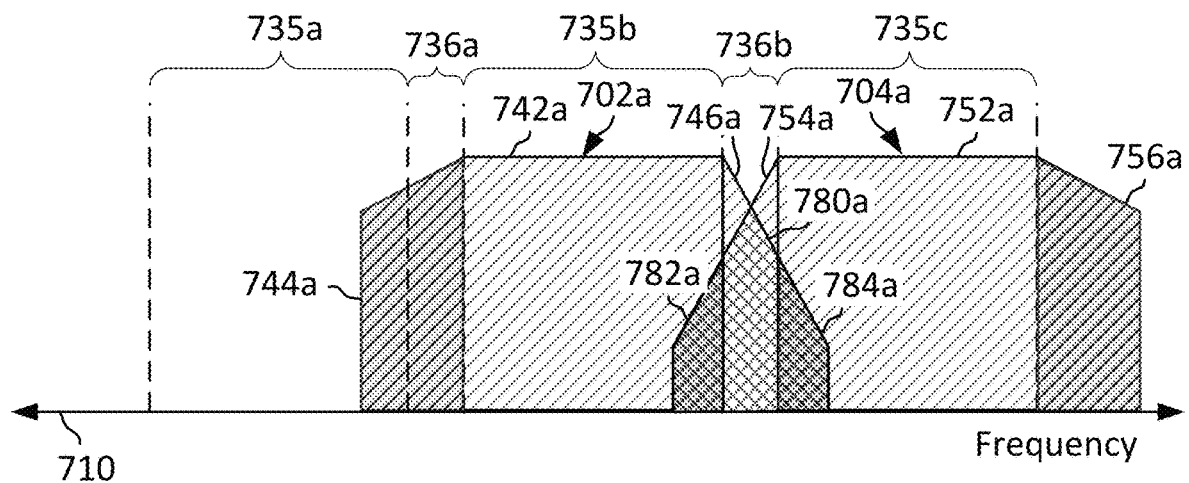
FIG. 7A is a diagrammatic view of asymmetrically shaped waveforms according to some aspects of the present disclosure.

FIG. 7A is a diagrammatic view of asymmetrically shaped waveforms according to some aspects of the present disclosure. FIG. 7A shows a waveform 702a and a waveform 702a occupying a carrier 735b and a carrier 735c respectively. The carriers 735a, 735b, and 735c may correspond to frequency ranges along the frequency scale 710. As previously explained with reference to FIG. 5, the selection and/or application of an asymmetric WOLA filter may be based on the presence of waveforms in adjacent or nearby carriers. Asymmetric WOLA filters have been applied to the waveforms 702a and 704a, as shown.

In FIG. 7A, a wireless communication device transmitting the waveform 702a may have determined, e.g., based on a clear channel assessment or an indication from another device, that the carrier 735c is occupied by a separate wireless device. The wireless communication device may also have determined that the carrier 735a is unoccupied. In this case, suppression of out-of-band signals associated with waveform 702a may more desirable on the side of the occupied carrier 735c than the unoccupied carrier 735a. Accordingly, an asymmetrical WOLA filter may be applied to the waveform 702a to prioritize suppression, and therefore reduce potential interference, with the carrier 735c. For example, the asymmetrical WOLA filter may reduce out-of-band PSD of the waveform 702a within the guard band 736b and the carrier 735c. The asymmetric suppression of the waveform 702a may be illustrated by a steeper roll off of the waveform 702a in the guard band 736b (e.g., portion 746a of the waveform) than the guard band 736a. The waveform 702a may include a region 742a corresponding to signals within the intended frequency range of the carrier 735b, as well as a region 744a corresponding to frequencies below the intended frequency range of the carrier 735b and a region 746a corresponding to frequencies above the intended frequency range of the carrier 735b.

In some aspects, a wireless communication device associated with communication within the carrier 735c may also perform a clear channel assessment to determine that the carrier 735b is occupied. In one example, the carrier 735c may be occupied by the waveform 704a. Accordingly, an asymmetrical WOLA filter may be applied to the waveform 704a to prioritize suppression, and therefore reduce potential interference, with the carrier 735b. The waveform 704a may include a region 752a corresponding to signals within the intended frequency range of the carrier 735c, as well as a region 754a corresponding to frequencies below the intended frequency range of the carrier 735c and a region 756a corresponding to frequencies above the intended frequency range of the carrier 735c. The asymmetric suppression of the waveform 704a may be illustrated by a steeper roll off of the waveform 704a at the region 754a.

In the example shown in FIG. 7A, because both the shape of the waveform 702a and the waveform 704a have been altered with an asymmetrical WOLA filter, interference between the two waveforms may be reduced. This reduction in interference may be illustrated by the lesser amplitudes of out-of-band regions 746a and 754a. Specifically, a region 784a corresponding to an overlapping of the out-of-band region 746a of the waveform 702a and the region 752a of the waveform 704a illustrates how interference between the neighboring waveforms is less than if symmetrical WOLA filters were applied (compare, e.g., region 784d of FIG. 7D). A similar region 782a is also reduced in comparison. A region 780a within the guard band 736b is also shown corresponding to an overlap of the regions 746a and 754a.

In some aspects, a wireless communication device may shape a waveform asymmetrically based on resource scheduling. For example, referring to FIG. 7A, a transmitting wireless communication device may schedule communication on two adjacent carriers, such as a carrier 735b and a carrier 735c. The transmitting wireless communication device may be a network unit and/or a UE. The transmitting wireless communication device may schedule resources corresponding to the carrier 735b for communication with another wireless communication device (e.g., a UE and/or a network unit) and may schedule resources corresponding to the carrier 735c for communication with a different wireless communication device (e.g., another UE and/or another network unit). In this way, the transmitting wireless communication device may not need to perform a CCA or similar procedure to determine that the adjacent carriers 735b and 735c may be occupied. The transmitting wireless communication device may identify the adjacent waveforms and potential interference based on the scheduling of resources for the communications. In this regard, the transmitting wireless communication may shape the waveforms 702a and 704a asymmetrically (e.g., as shown in FIG. 7A) to reduce interference between the communications.

In the scenarios shown and described with reference to FIGS. 7A-7D, the carriers 735a, 735b, and/or 735c may each correspond to different RATs or the same RAT. For example, with reference to FIG. 7A, the carrier 735b may correspond to LTE or NR communication and the carrier 735c may correspond to WiFi communication.

Figure 7B:
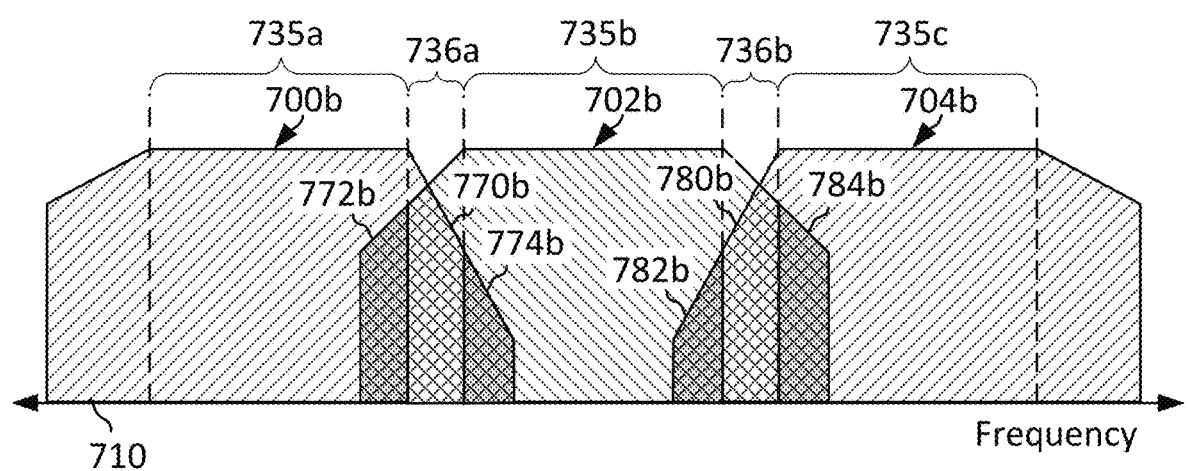
FIG. 7B is a diagrammatic view of asymmetrically shaped waveforms according to some aspects of the present disclosure.

FIG. 7B is a diagrammatic view of asymmetrically shaped waveforms according to some aspects of the present disclosure. FIG. 7B illustrates another communication scenario in which an asymmetrical WOLA filter may be applied to more effectively reduce interference between carriers. FIG. 7B illustrates a waveform 700b occupying the carrier 735a, a waveform 702b occupying the carrier 735b, and a waveform 704b occupying the carrier 735c. As described with reference to FIG. 7A, each of the carriers 735a, 735b, and 735c may correspond to different RATs and/or the same RAT.

In one aspect, a wireless communication device scheduled to transmit the waveform 700b within the carrier 735a may perform a CCA and determine that the carrier 735b is occupied. The wireless communication device may also determine that a neighboring carrier (not shown) lower in frequency than the carrier 735a is not occupied. Based on the carrier 735b being occupied and a lower carrier being unoccupied, the wireless communication device may asymmetrically shape the waveform 700b so as to reduce out-of-band PSD of the waveform 700b within the guard band 736a and the carrier 735b. Potential interference between the waveforms 700b and 702b within the carrier 735a may illustrated by the region 772b. Potential interference between the waveforms 700b and 702b within the guard band 736a may be illustrated by the region 770b. Potential interference between the waveforms 700b and 702b within the carrier 735b may be illustrated by the region 774b.

Similarly, a wireless communication device scheduled to transmit the waveform 704b may perform a CCA to determine that the carrier 735b is occupied. The wireless communication device may also determine that a neighboring carrier (not shown) of higher frequency than the carrier 735c is not occupied. Based on the carrier 735b being occupied and the higher frequency carrier being unoccupied, the wireless communication device may shape the waveform 704b asymmetrically to reduce out-of-band PSD of the waveform 704b within the guard band 736b and the carrier 735b. Potential interference between the waveforms 704b and 702b within the carrier 735c may be illustrated by the region 784b. Potential interference between the waveforms 704b and 702b within the guard band 736b may be illustrated by the region 780b. Potential interference between the waveforms 704b and 702b within the carrier 735b may be illustrated by the region 782b.

A wireless communication device transmitting the waveform 702b may perform a CCA to determine that the carriers 735a and 735c are both occupied. Based on both neighboring carriers being occupied, the wireless communication device may apply a symmetrical WOLA filter to the waveform 702b to reduce out-of-band PSD of the waveform 702b evenly.

Figure 7C:
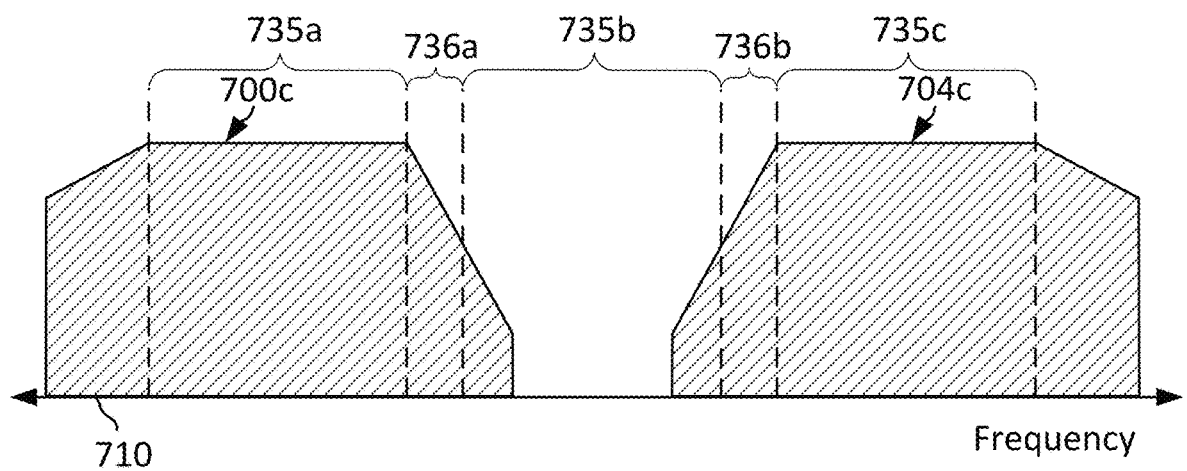
FIG. 7C is a diagrammatic view of asymmetrically shaped waveforms according to some aspects of the present disclosure.

FIG. 7C is a diagrammatic view of asymmetrically shaped waveforms according to some aspects of the present disclosure. FIG. 7C illustrates another communication scenario in which the power spectral density of waveforms may be altered according to an asymmetrical WOLA filter to more effectively reduce interference between carriers.

FIG. 7C illustrates a waveform 700c occupying the carrier 735a and a waveform 704c occupying the carrier 735c. As described with reference to FIG. 7A, each of the carriers 735a, 735b, and 735c may correspond to different RATs or the same RAT. In one aspect, a wireless communication device scheduled to transmit the waveform 700c may perform a CCA to determine that the carrier 735b is unoccupied and that the carrier 735c is occupied. In some instances, the wireless communication device may also determine that a neighboring carrier (not shown) of lower frequency than the carrier 735a is not occupied. Based on the carrier 735c being occupied, the wireless communication device may shape the waveform 700c asymmetrically to reduce out-of-band PSD of the waveform 700c towards the carrier 735c (e.g., within the guard band 736a and the carrier 735b). Although the carrier 735b is not occupied, an asymmetrical WOLA filter applied to the waveform 700c may further ensure that there is minimum interference between the waveform 700c and the waveform 704c.

Similarly, a wireless communication device scheduled to transmit the waveform 704c may perform a CCA to determine that the carrier 735b is unoccupied and that the carrier 735a is occupied. In some instances, the wireless communication device may also determine that a neighboring carrier (not shown) of higher frequency than the carrier 735c is not occupied. Based on the carrier 735a being occupied, the wireless communication device may shape the waveform 704c asymmetrically to reduce out-of-band PSD of the waveform 704c towards the carrier 735a (e.g., within the guard band 736b and the carrier 735b). Although the carrier 735b is not occupied, an asymmetrical WOLA filter applied to the waveform 704c may further ensure that there is minimum interference between the waveform 700c and the waveform 704c.

Figure 7D:
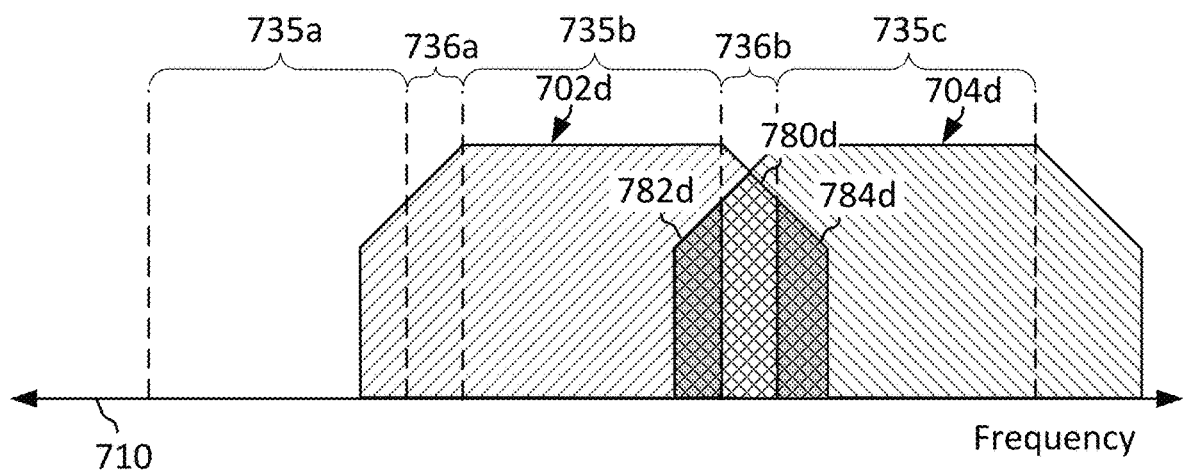
FIG. 7D is a diagrammatic view of symmetrically shaped waveforms according to some aspects of the present disclosure.

FIG. 7D is a diagrammatic view of symmetrically shaped waveforms according to some aspects of the present disclosure. FIG. 7D illustrates a communication scenario in which a symmetrical WOLA filter may be applied. FIG. 7D illustrates a waveform 702d occupying the carrier 735b and a waveform 704d occupying the carrier 735c. As described previously, each of the carriers 735a, 735b, and 735c may correspond to different RATs or the same RAT. As shown in FIG. 7D, potential interference between the waveform 702d and the waveform 704d may be illustrated by the regions 782d, 780d, and 784d. Specifically, the region 782d may correspond to potential interference of an out-of-band portion of the waveform 704d with the waveform 702d within the carrier 735b. The region 780d may correspond to potential interference between out-of-band portions of the waveforms 702d and 704d within the guard band 736b. The region 784d may correspond to potential interference of an out-of-band portion of the waveform 702d with the waveform 704d within the carrier 735c. In comparison to the interference regions of FIGS. 7A-7B, the potential interference between adjacent waveforms that are filtered or shaped according to a symmetrical WOLA filter may be greater than the potential interference between adjacent waveforms that are filtered or shaped according to an asymmetrical WOLA filter.

Figure 8:
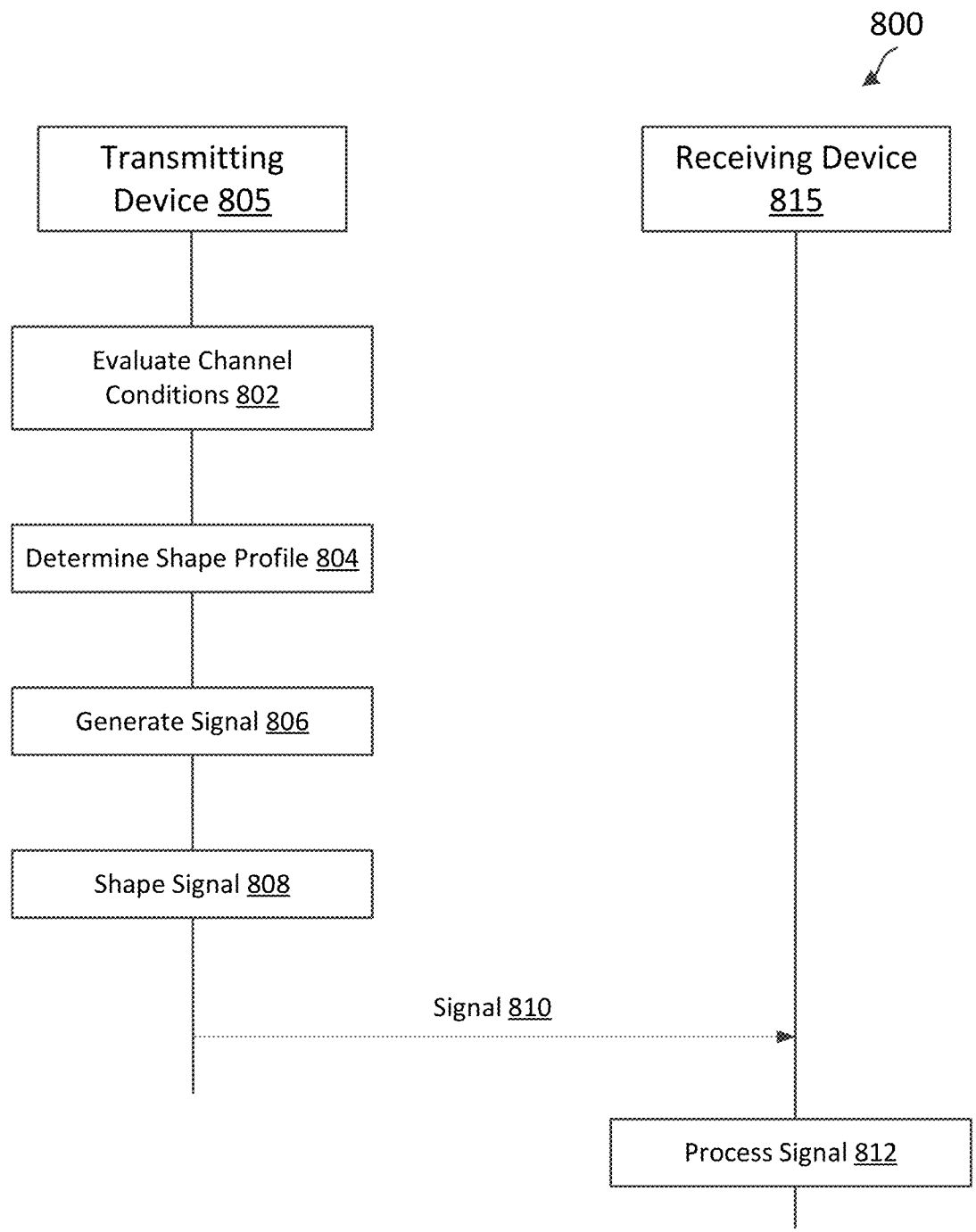
FIG. 8 is a signaling diagram of a method of filtering and transmitting a wireless communication signal according to some aspects of the present disclosure.

FIG. 8 is a signaling diagram 800 of a method of filtering and transmitting a wireless communication signal according to some aspects of the present disclosure. The diagram 800 may involve any of the network units described herein, including any of the network units 105 of FIG. 1, the network units 205 of FIG. 2, the network units 405 of FIG. 4, or the network unit 1000 of FIG. 10, as well as any user equipment described herein, such as the UEs 115 of FIG. 1, the UEs 415 of FIG. 4, or the UE 900 of FIG. 9. For simplicity of illustration and discussion, a single transmitting wireless device and a single receiving wireless device are shown. However, it is understood, for the purposes of describing the signaling diagram 800, that any suitable number of wireless communication devices including transmitting wireless communication devices and receiving wireless communication devices may be in communication according to any of the aspects of the signaling diagram. In addition, the transmitting device 805 and/or the receiving device 815 may be any suitable wireless communication devices, including a network units or a UEs. In one example, the signaling diagram 800 may apply to a communication scenario involving a network unit and a UE in communication or two network units or two UEs in communication in sidelink.

Figure 9:
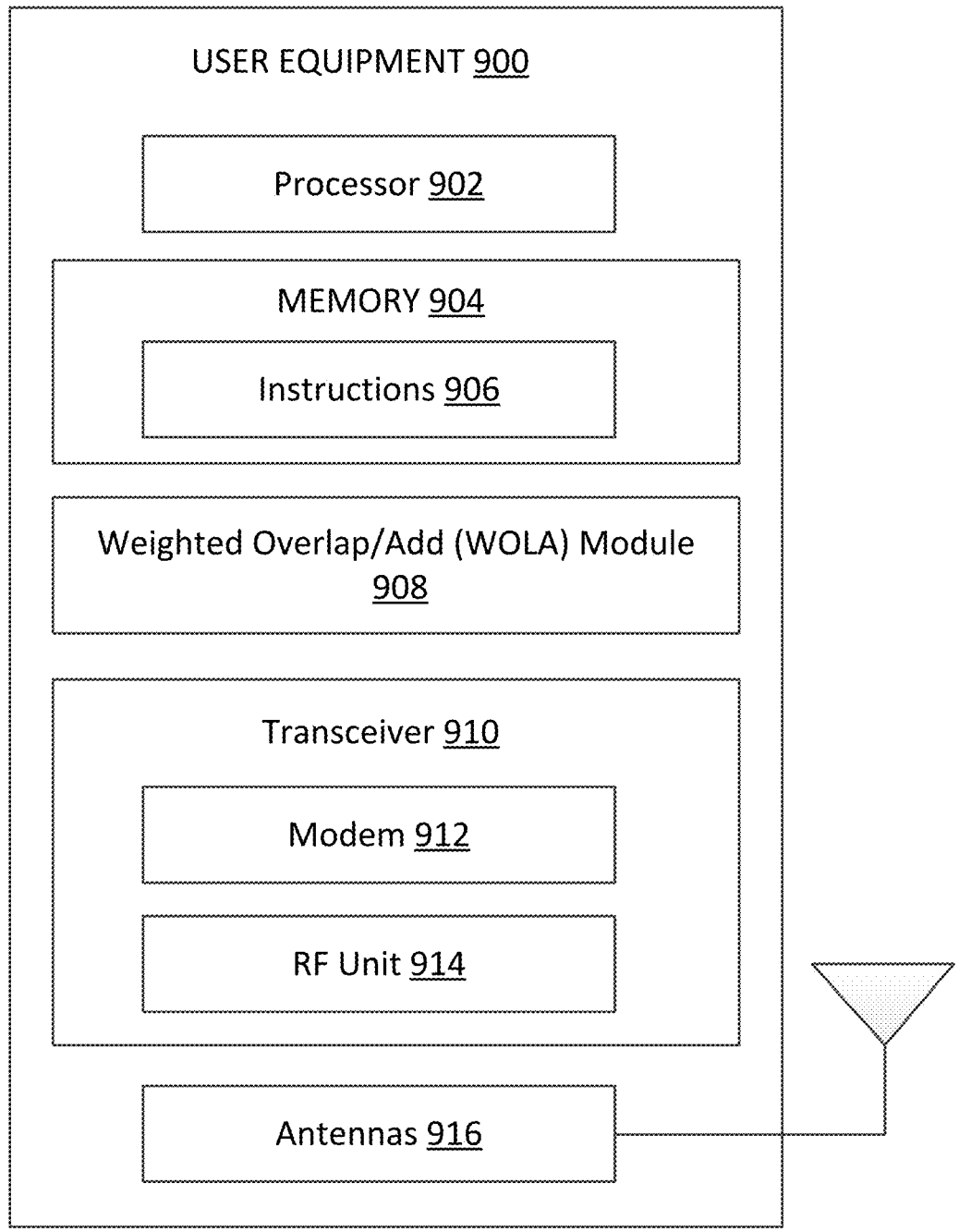
FIG. 9 is a block diagram of an exemplary user equipment according to some aspects of the present disclosure.
Figure 10:
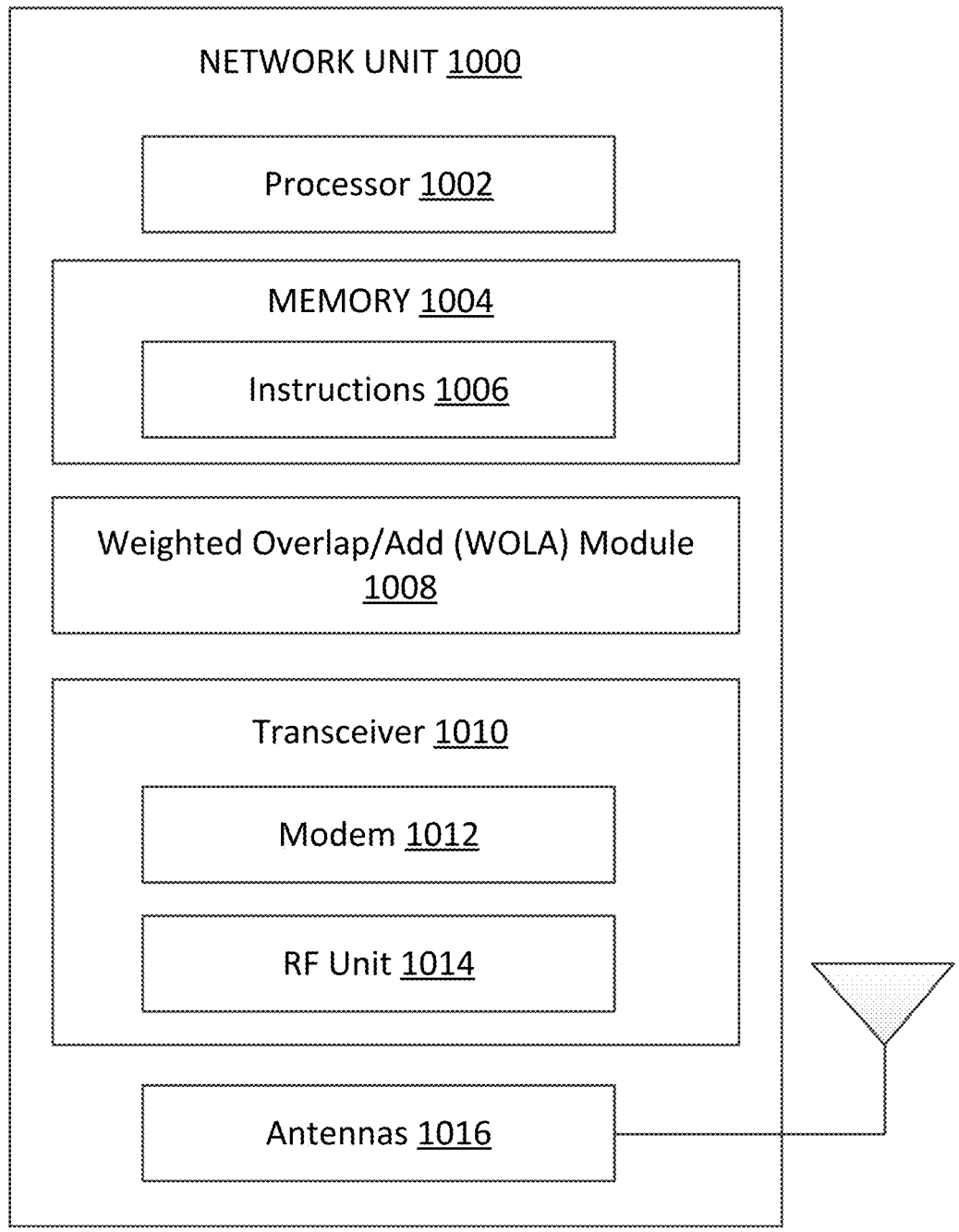
FIG. 10 is a block diagram of an exemplary network unit according to some aspects of the present disclosure.

In some aspects, the transmitting device 805 may utilize one or more components, such as the processor 1002, the memory 1004, the weighted overlap/add (WOLA) module 1008, the transceiver 1010, the modem 1012, and the one or more antennas 1016 shown in FIG. 10. The receiving device 815 may utilize one or more components, such as the processor 902, the memory 904, the weighted overlap/add (WOLA) module 908, the transceiver 910, the modem 912, and the one or more antennas 916 shown in FIG. 9. As illustrated, the signaling diagram 800 includes a number of enumerated actions, but aspects of FIG. 8 may include additional actions before, after, and between the enumerated actions. In some aspects, one or more of the enumerated actions may be omitted, combined together, or performed in a different order.

At action 802, the method includes evaluating channel conditions. Evaluating channel conditions at action 802 may include a wireless communication device (e.g., the transmitting device 805) performing a clear channel assessment in a shared spectrum and/or an unlicensed spectrum. In an unlicensed spectrum, a transmitting wireless communication device may be permitted to transmit if the clear channel assessment succeeds. The clear channel assessment may include any suitable LBT protocols, including LBT protocols with or without random back-off with fixed or variable sizes of contention windows, LBT protocols involving frame-based equipment (FBE) or load-based equipment (LBE), or any other LBT protocols. LBT protocols may include CAT2, CAT3, or CAT4.

In some aspects, the transmitting device 805 may determine time-frequency resources based on a clear channel assessment. In some aspects, the transmitting device 805 may transmit parameters, instructions, or an indication of the time-frequency resources (e.g., downlink control information) to the receiving device 815 after completion of action 804. In some aspects, transmission of this information my occur at action 810 described hereafter. Time-frequency resources may include a frequency bandwidth. The frequency bandwidth for a clear channel assessment may correspond to one or more 10 Mhz, 20 Mhz, and/or 40 Mhz sub-channels or other subcarrier spacing.

While evaluating channel conditions, the transmitting device 805 may determine whether various time frequency resources or carriers are being used by other wireless communication devices to transmit data. One purpose of evaluating channel conditions, therefore, may include selecting a carrier to be used for communication. Another purpose of evaluating channel conditions may be determining whether additional carriers, such as those neighboring the selected carrier on the frequency spectrum, or other closely related or positioned carriers are being used to transmit data.

In some aspects, the action 802 may not include performing a clear channel assessment. In some aspects, evaluating channel conditions may include identifying occupied and unoccupied carriers based on resource scheduling information. For example, as described with reference to FIG. 5, a transmitting wireless communication device may schedule communication on two adjacent carriers. The transmitting wireless communication device may schedule resources corresponding to one carrier for communication with another wireless communication device and may schedule resources corresponding to a different carrier for communication with a different wireless communication device. In this way, the transmitting wireless communication device may not need to perform a CCA or similar procedure to identify that waveforms may occupy adjacent carriers. The transmitting wireless communication device may identify the adjacent waveforms and potential interference based on the scheduling of resources.

At action 804, the method includes determining a shape profile. A shape profile may include a filter, such as a symmetrical or asymmetrical WOLA filter, to be applied to a particular waveform before transmission. The transmitting device 805 may use the results of the action 802 to determine an appropriate shape profile. For example, the results of the action 802 may include the selection of a carrier for communication based on which carriers are occupied. The results may also include an indication that a carrier on one side of the selected carrier is currently occupied but that the carrier on the other side is unoccupied. Based on these results, the transmitting device 805 may determine that an asymmetrical shape profile would reduce interference. Such a profile may suppress out-of-band signals on the side of the occupied carrier more than out-of-band signals on the side of the unoccupied carrier. In other aspects, the results of the action 802 may indicate that both neighboring carriers are occupied. In such a scenario, the transmitting device 805 may alternatively apply a symmetrical filter.

At action 806, the method includes generating a signal. Action 806 may include generating a waveform in the selected carrier based on the data to be transmitted and/or received. The waveform may include any suitable user data, including but not limited to control information, reference signals, signal reports, uplink communications, downlink communications, sidelink communications, and/or any other type of data/communications. In addition, the waveform may occupy any suitable time or frequency resources At action 808, the method includes shaping the signal. At action 808, the wireless communication device may apply the shape selected at action 804 to the waveform generated at 806. As previously explained, shaping the waveform asymmetrically may cause less interference with one neighboring carrier than the other neighboring carrier.

At action 810, the method includes transmitting the signal. Transmitting the signal may include transmitting the asymmetrically shaped waveform. The waveform may be received by the receiving device 815.

At action 812, the method includes the receiving device 815 processing the received signal. In some instances, the receiving device 815 may filter and/or decode the received signal. In some instances, the receiving device 815 may filter the received signal with an asymmetrical WOLA filter in accordance with the present disclosure.

FIG. 9 is a block diagram of an exemplary UE 900 according to some aspects of the present disclosure. The UE 900 may be a UE 115 as discussed in FIG. 1 or a UE 515 as discussed in FIG. 5. As shown, the UE 900 may include a processor 902, a memory 904, a weighted overlap/add (WOLA) module 908, a transceiver 910 including a modem subsystem 912 and a radio frequency (RF) unit 914, and one or more antennas 916. These elements may be coupled with one another. The term "coupled" may refer to directly or indirectly coupled or connected to one or more intervening elements. For instance, these elements may be in direct or indirect communication with each other, for example via one or more buses.

The processor 902 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 904 includes a non-transitory computer-readable medium. The memory 904 may store, or have recorded thereon, instructions 906. The instructions 906 may include instructions that, when executed by the processor 902, cause the processor 902 to perform the operations described herein with reference to a UE 115 or an anchor in connection with aspects of the present disclosure. Instructions 906 may also be referred to as code, which may be interpreted broadly to include any type of computer-readable statement(s) as discussed with respect to FIG. 10.

The WOLA module 908 may be implemented via hardware, software, or combinations thereof. For example, the WOLA module 908 may be implemented as a processor, circuit, and/or instructions 906 stored in the memory 904 and executed by the processor 902. In some aspects, the WOLA module 908 can be integrated within the modem subsystem 912. For example, the WOLA module 908 can be implemented by a combination of software components (e.g., executed by a DSP or a general processor) and hardware components (e.g., logic gates and circuitry) within the modem subsystem 912. The WOLA module 908 may communicate with one or more components of UE 900 to implement various aspects of the present disclosure.

In some aspects, the WOLA module 908 may be configured to shape a waveform according to an asymmetric WOLA profile prior to transmitting the waveform. For example, in a scenario in which the UE 900 transmits data to another device, such as another UE via sidelink communication or a network unit, the WOLA module 908 may receive the data for transmission and/or an indication of a frequency range corresponding to a carrier to be used for communication. The WOLA module may then shape the waveform to be transmitted with a WOLA profile.

In some aspects, the WOLA module 908 may be configured to shape a waveform according to a WOLA profile. A WOLA filter may be selected and/or generated based on the WOLA profile. The shape of the WOLA filter may be based on a number of factors including, for example, the results of a clear channel assessment or resource scheduling information. As previously described, the shape of the WOLA filter may be selected based on the presence of waveforms in other neighboring or nearby carriers. Determining the shape of the WOLA filter to be applied to the waveform to be transmitted may include determining whether the shape is symmetrical (e.g., a real-valued rectangular WOLA filter) or asymmetrical (e.g., a complex-valued circular WOLA filter). Additionally, the WOLA module 908 may determine the level of suppression of either side of out-of-band frequencies of the waveform to be transmitted or any other modifications.

In some aspects, the WOLA module 908 may be configured to determine a length of the WOLA filter. In some instances, the WOLA filter length may be shorter to reduce an amount of the cyclic prefix (CP) consumed by the WOLA filter. In some aspects, selecting the length of the WOLA filter may be based on one or more channel conditions associated with a shared spectrum or resource scheduling information. In accordance with the present disclosure, an asymmetric WOLA filter may advantageously be a shorter WOLA filter for the same desired transmit or receive PSD characteristics than a symmetric WOLA filter. The WOLA module 908 may shape the waveform by applying the WOLA filter to the waveform to be transmitted and then send the shaped waveform to the transceiver for transmission.

In aspects in which the UE 900 receives a waveform, the WOLA module 908 may filter the received waveform to reduce interference. For example, the WOLA module 908 may receive the waveform from antennas 916 or other components of the UE 900 and filter the waveform by generating and/or applying a WOLA filter to the waveform. In some instances, the waveform may have been asymmetrically shaped by the transmitting device before transmission. In other instances, the waveform may not have been asymmetrically shaped.

As shown, the transceiver 910 may include the modem subsystem 912 and the RF unit 914. The transceiver 910 can be configured to communicate bi-directionally with other devices, such as the network units 105 and 1000. The modem subsystem 912 may be configured to modulate and/or encode the data from the memory 904 and/or the WOLA module 908 according to a modulation and coding scheme (MCS), e.g., a low-density parity check (LDPC) coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., channel sensing reports, PUCCH UCI, PUSCH data, etc.) or of transmissions originating from another source such as a UE 115, a network unit 105, or an anchor. The RF unit 914 may be further configured to perform analog beamforming in conjunction with the digital beamforming. Although shown as integrated together in transceiver 910, the modem subsystem 912 and the RF unit 914 may be separate devices that are coupled together at the UE 900 to enable the UE 900 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The transceiver 910 may provide the demodulated and decoded data (e.g., RRC table(s) for channel access configurations, scheduling grants, channel access configuration activation, timing advance configurations, RRC configurations, PUSCH configurations, SRS resource configurations, PUCCH configurations, BWP configurations, PDSCH data, PDCCH DCI, etc.) to the WOLA module 908 for processing. The antennas 916 may include multiple antennas of similar or different designs in order to sustain multiple transmission links.

In an aspect, the UE 900 can include multiple transceivers 910 implementing different RATs (e.g., NR and LTE). In an aspect, the UE 900 can include a single transceiver 910 implementing multiple RATs (e.g., NR and LTE). In an aspect, the transceiver 910 can include various components, where different combinations of components can implement different RATs.

Further, in some aspects, the processor 902 is coupled to the memory 904 and the transceiver 910. The processor 902 is configured to communicate, with a second wireless communication device via the transceiver 910, one or more timing advance configurations and/or one or more cell configurations. The processor 902 may be further configured to generate filters for transmitted or received waveforms.

FIG. 10 is a block diagram of an exemplary network unit 1000 according to some aspects of the present disclosure. The network unit 1000 may be a network unit 105 as discussed in FIG. 1, and or a TRP as discussed in FIGS. 2 and 6. For example, the network unit 1000 may be configured as one of multiple TRPs in a network configured for communication with at least one UE, such as one of the UEs 115, 415, 515, and/or 1200. As shown, the network unit 1000 may include a processor 1002, a memory 1004, a weighted overlap/add (WOLA) module 1008, a transceiver 1010 including a modem subsystem 1012 and a RF unit 1014, and one or more antennas 1016. These elements may be coupled with one another. The term "coupled" may refer to directly or indirectly coupled or connected to one or more intervening elements. For instance, these elements may be in direct or indirect communication with each other, for example via one or more buses.

The processor 1002 may have various features as a specific-type processor. For example, these may include a CPU, a DSP, an ASIC, a controller, a FPGA device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1004 may include a non-transitory computer-readable medium. The memory 1004 may store instructions 1006. The instructions 1006 may include instructions that, when executed by the processor 1002, cause the processor 1002 to perform operations described herein, for example, aspects of FIGS. 6-9. Instructions 1006 may also be referred to as program code. The program code may be for causing a wireless communication device to perform these operations, for example by causing one or more processors (such as processor 1002) to control or command the wireless communication device to do so. The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may include a single computer-readable statement or many computer-readable statements.

The WOLA module 1008 may be implemented via hardware, software, or combinations thereof. For example, the WOLA module 1008 may be implemented as a processor, circuit, and/or instructions 1006 stored in the memory 1004 and executed by the processor 1002. In some aspects, the WOLA module 1008 can be integrated within the modem subsystem 1012. For example, the WOLA module 1008 can be implemented by a combination of software components (e.g., executed by a DSP or a general processor) and hardware components (e.g., logic gates and circuitry) within the modem subsystem 1012. The WOLA module 1008 may communicate with one or more components of network unit 1000 to implement various aspects of the present disclosure.

In some aspects, the WOLA module 1008 may be configured to shape a waveform according to a symmetrical or asymmetrical WOLA profile prior to transmitting the waveform. For example, in a scenario in which the network unit 1000 transmits data to another device, such as a UE or another network unit, the WOLA module 1008 may receive the data for transmission and/or an indication of a frequency range corresponding to a carrier to be used for communication. The WOLA module may then shape the waveform to be transmitted with a WOLA profile.

In some aspects, the WOLA module 1008 may be configured to shape a waveform according to a WOLA profile. A WOLA filter may be selected and/or generated based on the WOLA profile. The shape of the WOLA filter may be based on a number of factors including, for example, the results of a clear channel assessment or resource scheduling information. As previously described, the shape of the WOLA filter may depend on whether close or neighboring carriers are occupied. Determining the shape of the WOLA filter to be applied to the waveform to be transmitted may include determining whether the shape is symmetrical (e.g., a real-valued rectangular WOLA filter) or asymmetrical (e.g., a complex-valued circular WOLA filter). Additionally, the WOLA module 1008 may determine the level of suppression of either side of out-of-band frequencies of the waveform to be transmitted or any other modifications.

In some aspects, the WOLA module 1008 may be configured to determine a length of the WOLA filter. In some instances, the WOLA filter length may be shorter to reduce an amount of the cyclic prefix (CP) consumed by the WOLA filter. In some aspects, selecting the length of the WOLA filter may be based on one or more channel conditions associated with a shared spectrum. In accordance with the present disclosure, an asymmetric WOLA filter may advantageously be a shorter WOLA filter for the same desired transmit or receive PSD characteristics than a symmetric WOLA filter. The WOLA module 1008 may shape the waveform by applying a WOLA filter to the waveform to be transmitted and then send the shaped waveform to the transceiver for transmission.

In aspects in which the network unit 1000 receives a waveform, the WOLA module 1008 may filter the received waveform to reduce interference. For example, the WOLA module 1008 may receive the waveform from antennas 916 or other components of the network unit 1000 and filter the waveform by generating and/or applying a WOLA filter to the waveform. In some instances, the waveform may have been asymmetrically shaped by the transmitting device before transmission. In other instances, the waveform may not have been asymmetrically shaped.

As shown, the transceiver 1010 may include the modem subsystem 1012 and the RF unit 1014. The transceiver 1010 can be configured to communicate bi-directionally with other devices, such as the UEs 115 and/or network unit 1000 and/or another core network element. The modem subsystem 1012 may be configured to modulate and/or encode data according to a MCS, e.g., a LDPC coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data (e.g., RRC table(s) for channel access configurations, scheduling grants, channel access configuration activation, RRC configurations, PDSCH data, PDCCH DCI, RACH Preamble Assignments, random access messages, etc.) from the modem subsystem 1012 (on outbound transmissions) or of transmissions originating from another source such as a UE 115, 415, and/or UE 900. The RF unit 1014 may be further configured to perform analog beamforming in conjunction with the digital beamforming. Although shown as integrated together in transceiver 1010, the modem subsystem 1012 and/or the RF unit 1014 may be separate devices that are coupled together at the network unit 1000 to enable the network unit 1000 to communicate with other devices.

The RF unit 1014 may provide the modulated and/or processed data, e.g. data packets (or, more generally, data messages that may contain one or more data packets and other information), to the antennas 1016 for transmission to one or more other devices. The antennas 1016 may further receive data messages transmitted from other devices and provide the received data messages for processing and/or demodulation at the transceiver 1010. The transceiver 1010 may provide the demodulated and decoded data (e.g., PRACH messages, channel sensing reports, PUCCH UCI, PUSCH data, etc.) to the WOLA module 1008 for processing. The antennas 1016 may include multiple antennas of similar or different designs in order to sustain multiple transmission links.

In an aspect, the network unit 1000 can include multiple transceivers 1010 implementing different RATs (e.g., NR and LTE). In an aspect, the network unit 1000 can include a single transceiver 1010 implementing multiple RATs (e.g., NR and LTE). In an aspect, the transceiver 1010 can include various components, where different combinations of components can implement different RATs.

Further, in some aspects, the processor 1002 is coupled to the memory 1004 and the transceiver 1010. The processor 1002 is configured to communicate, with a second wireless communication device via the transceiver 1010, a plurality of channel access configurations. The processor 1002 is further configured to communicate, with the second wireless communication device via the transceiver 1010, a scheduling grant for communicating a communication signal in an unlicensed band, where the scheduling grant includes an indication of a first channel access configuration of the plurality of channel access configurations. The processor 1002 is further configured to communicate, with the second wireless communication device in the unlicensed band via the transceiver 1010 based on the first channel access configuration, the communication signal.

Figure 11:
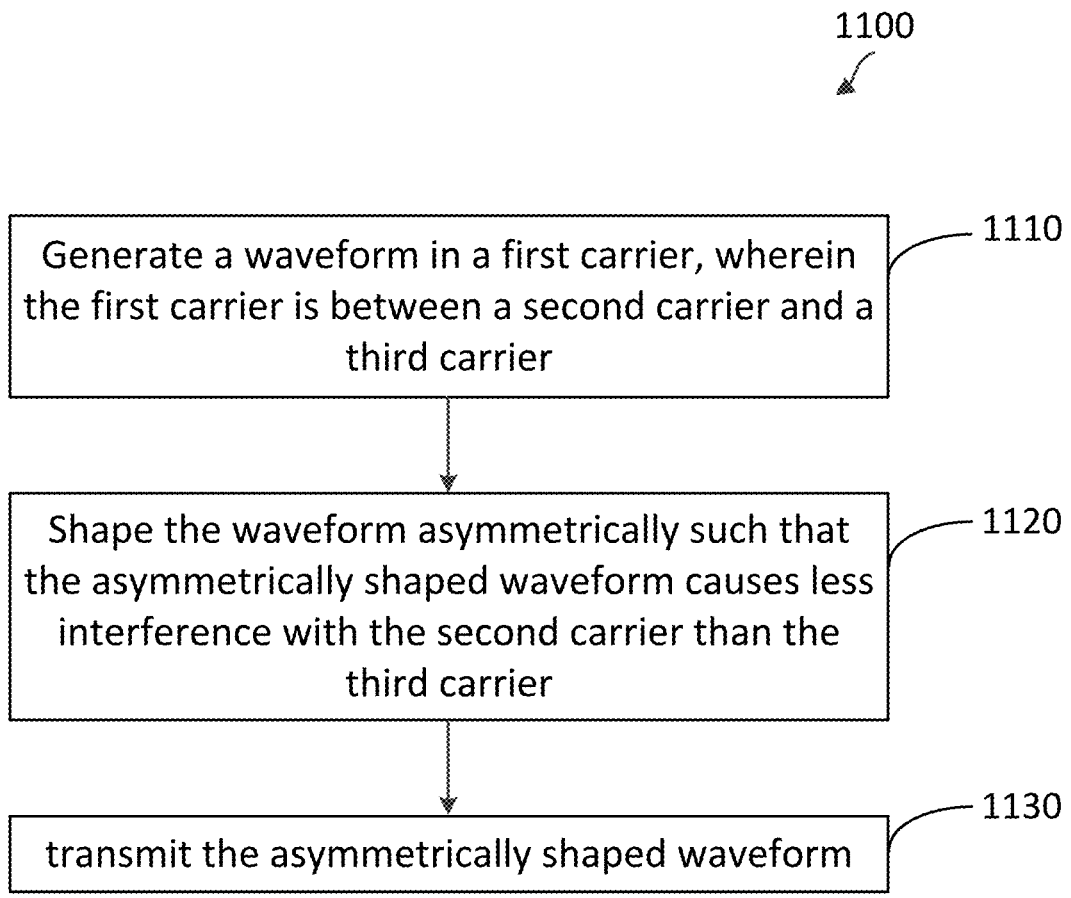
FIG. 11 is a flow diagram of a wireless communication method according to some aspects of the present disclosure.

FIG. 11 is a flow diagram of a wireless communication method, according to some aspects of the present disclosure. Aspects of the method 1100 can be executed by a computing device (e.g., a processor, processing circuit, and/or other suitable component) of a wireless communication device or other suitable means for performing the aspects. For example, a wireless communication device, such as the UE 115 or UE 900, may utilize one or more components, such as the processor 902, the memory 904, the WOLA module 908, the transceiver 910, the modem 912, and the one or more antennas 916, to execute aspects of the method 1100. In some aspects, a wireless communication device configured to perform the aspects of the method 1100 may include a base station or network unit, such as the network unit 105 or the network unit 1000. For example, a wireless communication device including a network unit may utilize one or more components, such as the processor 1002, the memory 1004, the WOLA module 1008, the transceiver 1010, the modem 1012, and the one or more antennas 1016, to execute aspects of the method 1100. The method 1100 may employ similar mechanisms as in the networks 100 and 200 and the aspects and actions described with respect to FIGS. 3-8. As illustrated, the method 1100 includes a number of enumerated aspects, but the method 1100 may include additional aspects before, after, and in between the enumerated aspects. In some aspects, one or more of the enumerated aspects may be omitted or performed in a different order.

At action 1110, the method 1100 includes a wireless communication device (e.g., the UE 115, the network unit 105, the UE 900, or the network unit 1000) generating a waveform in a first carrier, wherein the first carrier is between a second carrier and a third carrier. Aspects of the method 1100 provide ways of reducing interference of data signals within carriers neighboring in frequency. In this regard, the waveform may include user data, control information, reference signals, signal reports, uplink communications, downlink communications, sidelink communications, and/or any other type of data/communications. In addition, the waveform may occupy any suitable time or frequency resources. In some aspects, the first and second carrier and/or the second and third carrier may be separated in frequency by a guard band (see, e.g., FIG. 5) and/or one or more other carriers.

Additional waveforms, including waveforms similar to the waveform of the first carrier previously described, may occupy either or both of the second carrier and the third carrier. In some aspects, regions of the waveform of the first carrier may overlap into guard bands on either side of the first carrier as well as into the second and/or third carrier. Similarly, regions of a waveform occupying the second carrier and/or the third carrier may overlap into its respective guard bands and/or adjacent carriers. In some aspects, no waveforms may occupy the second or third carriers. In some aspects, the first carrier is part of a shared spectrum. In some aspects, the shared spectrum includes an unlicensed spectrum. An unlicensed spectrum may include any suitable type of unlicensed spectrum including an anchored unlicensed spectrum or a standalone unlicensed spectrum.

In some aspects, the first carrier is associated with a first radio access technology (RAT) and at least one of the second carrier or the third carrier is associated with a second RAT, the second RAT being different than the first RAT. In some aspects, the first RAT includes at least one of long-term evolution (LTE) or new radio (NR) and the second RAT includes WiFi. In other examples, any of the first carrier, the second carrier, or the third carrier may be associated with any suitable RAT, including LTE, NR, WiFi, Bluetooth, GSM, UMTS, and/or any other RAT. Applications of the present disclosure may improve coexistence in frequency bands where different RATs (e.g., cellular and WiFi) are close in frequency (e.g., adjacent RATs).

In some aspects, the wireless communication device could be a UE or a network unit (e.g., a BS, a CU, a DU, an RU, and/or combinations thereof). The wireless communication device may be a UE or network unit of any type, including any of those shown and/or described with reference to FIGS. 1-4, 9, and 10 above.

In some aspects, the wireless communication device may perform a clear channel assessment (CCA) in the shared spectrum and/or the unlicensed spectrum. In some instances, the wireless communication device may shape the waveform asymmetrically based on the CCA. In an unlicensed spectrum, a transmitting wireless communication device may be permitted to transmit if the clear channel assessment succeeds. A clear channel assessment may be alternatively referred to as a listen-before-talk or listen-before-transmit procedure. The clear channel assessment may include any suitable LBT protocols, including LBT protocols with or without random back-off with fixed or variable sizes of contention windows, LBT protocols involving frame based equipment (FBE) or load based equipment (LBE), or any other LBT protocols. LBT protocols may include CAT2, CAT3, or CAT4.

In some aspects, a clear channel assessment may be associated with time-frequency resources. A wireless communication device, such as a network unit, a UE, or another device, may transmit parameters, instructions, or an indication of the time-frequency resources for the clear channel assessment. Time-frequency resources may include a frequency bandwidth. The frequency bandwidth for a clear channel assessment may correspond to one or more 10 Mhz, 20 Mhz, and/or 40 Mhz sub-channels or other subcarrier spacing.

At action 1120, the method 1100 includes the wireless communication device (e.g., the UE 115, the network unit 105, the UE 900, or the network 1000) shaping the waveform asymmetrically such that the asymmetrically shaped waveform causes less interference with the second carrier than the third carrier. In this regard, aspects of the method 1100 advantageously allow a transmitting and/or receiving wireless communication device to focus suppression to one side of the desired signal. For example, a transmitting device, e.g., in an unlicensed band, can benefit from one-sided out-of-band (OOB) power spectral density (PSD) suppression to limit interference with an adjacent transmission of another device, which may be associated with the same or a different RAT. The wireless communication device may shape the waveform asymmetrically prior to transmission of the waveform.

In some aspects, at action 1120, the wireless communication device may shape the waveform asymmetrically by applying a weighted overlap and add (WOLA) filter. Applying the asymmetrical WOLA filter to the waveform within a carrier may suppress power spectral density of the waveform outside the frequency range of the carrier. For example, applying an asymmetrical WOLA filter to the waveform of the first carrier will suppress the power spectral density of the waveform towards at least one of the second carrier or the third carrier. In this regard, the WOLA filter applied may be configured to suppress the power spectral density within the second carrier and/or the guard band between the first carrier and the second carrier to a greater extent than the power spectral density within the third carrier and/or the guard band between the first carrier and the third carrier (see, e.g., FIG. 5), or vice versa. In some aspects, the degree of suppression of out-of-band signals may depend on the frequency of the signal and/or the distance of out-of-band signals along the frequency scale from the intended carrier of the waveform. For example, as shown and described with reference to FIG. 5 previously, greater suppression may be applied to out-of-band signals farther from the intended carrier. This varying degree of suppression may have a linear and/or non-linear relationship with the distance outside the intended carrier frequency range. The asymmetric WOLA filter may be applied to a waveform by a transmitting wireless communication device before transmission.

An asymmetric WOLA filter may suppress power spectral density of out-of-band signals differently on either side of the carrier. Referring again to FIG. 5, for example, an asymmetrical WOLA filter may suppress out-of-band signals on one side of a carrier more aggressively than out-of-band signals on the opposite side of the carrier. The selection and/or application of an asymmetric WOLA filter may be based on the presence of waveforms in adjacent carriers (see, e.g., FIG. 7). For example, a wireless communication device transmitting a waveform on the first carrier may determine, e.g., based on a clear channel assessment, that an additional waveform is being simultaneously transmitted by a separate wireless device on the second carrier. The wireless communication device may also determine that no waveform is being transmitted on the third carrier. In this case, suppression is more desirable for out-of-band signals on the side of the second carrier than the third carrier. Accordingly, an asymmetrical WOLA filter may be applied to generate an asymmetrical signal to prioritize suppression, and therefore potential interference, with the second carrier.

In some aspects, the WOLA filter may include a complex-valued WOLA filter. A WOLA filter may define a transition from 0 to 1 and aspects of a WOLA filter may be implemented to suppress out-of-band signals. The calculation or formation of a WOLA filter may involve real or complex values. Aspects of the method 1100 may include generalizing a WOLA filter to 2-dimensional (e.g., complex-valued) pulse shapes. The calculation and/or generation of a WOLA filter may be based on a complex circle pulse. For example, a WOLA filter may be based on a mathematical relationship between attenuation of a signal with the frequency of the signal. In some instances, the WOLA filter applied by the wireless communication device, for example at action 1120 of the method 1100, may be based on Equation 1.

$$w(n) = [1 + e^{j\pi(n/N-1)}]/2 \qquad \text{Equation 1:}$$

In some instances, the WOLA filter applied by the wireless communication device may be based on Equation 2.

$$w(n) = \frac{1}{2} + \frac{1}{4a}[(a+b)e^{j\pi(n/N-1)} + (a-b)e^{-j\pi(n/N-1)}] \qquad \text{Equation 2}$$

In other instances, the WOLA filter applied may be based on any other suitable equation or relationship. In some aspects, in selecting the WOLA filter, the 2nd Nyquist criterion may be fulfilled. In this case, rising and falling WOLA slopes can add to unity. In some aspects, inter-carrier interference (ICI) free transmission and/or reception is possible. In some aspects (e.g., if power spectral density characteristics are more important than ICI-free OFDM transmission and/or reception), the 2nd Nyquist criterion may be lifted.

In some aspects, in shaping the waveform, the wireless communication device may select a length of the WOLA filter. In some instances, the WOLA filter length may be small to reduce portions of the cyclic prefix (CP) consumed by the WOLA filter. In some aspects, selecting the length of the WOLA filter may be based on one or more channel conditions associated with a shared spectrum. In accordance with the present disclosure, an asymmetric WOLA filter may advantageously be a shorter WOLA filter for the same desired transmit or receive PSD characteristics than a symmetric WOLA filter. In some instances, a wireless communication device may re-configure characteristics and/or parameters of a WOLA filter to optimize interference to adjacent sub-channels. This reconfiguration may occur at any time relative to events of transmission or reception. In some instances, reconfiguration may be based on a CCA outcome or other report or assessment.

At action 1130, the method 1100 includes the wireless communication device (e.g., the UE 115, the network unit 105, the UE 900, or the network unit 1000) transmitting the asymmetrically shaped waveform. As stated previously, the waveform may include user data, control information, reference signals, signal reports, uplink communications, downlink communications, sidelink communications, and/or any other type of data/communications.

Figure 12:
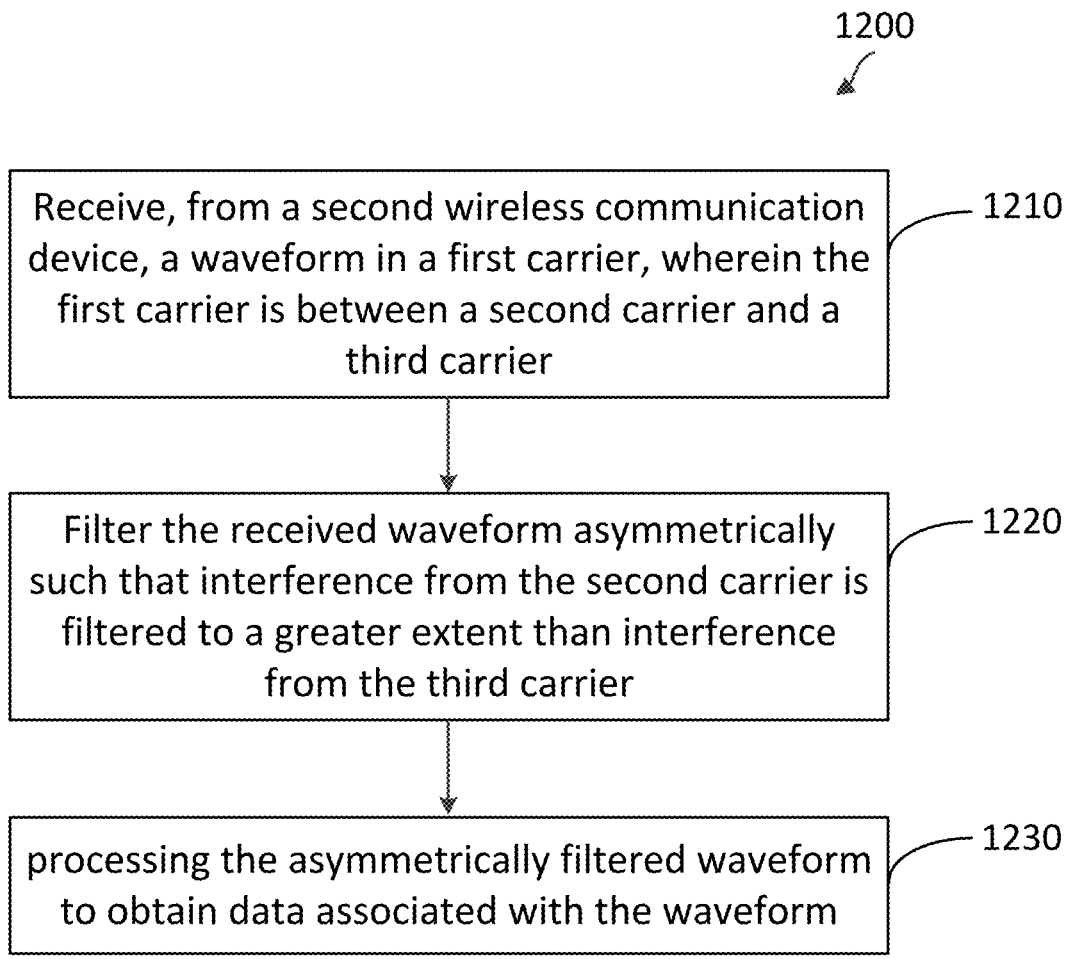
FIG. 12 is a flow diagram of a wireless communication method according to some aspects of the present disclosure.

FIG. 12 is a flow diagram of a wireless communication method, according to some aspects of the present disclosure. Aspects of the method 1200 can be executed by a computing device (e.g., a processor, processing circuit, and/or other suitable component) of a wireless communication device or other suitable means for performing the aspects. For example, a wireless communication device, such as the UE 115 or UE 900, or a BS or network unit, such as the network unit 105 or 1000, may utilize one or more components, such as the processor 902, the memory 904, the WOLA module 908, the transceiver 910, the modem 912, and the one or more antennas 916, or the processor 1002, the memory 1004, the WOLA module 1008, the transceiver 1010, the modem 1012, and the one or more antennas 1016, to execute aspects of the method 1200. The method 1200 may employ similar mechanisms as in the networks 100 and 200 and the aspects and actions described with respect to FIGS. 3-8. As illustrated, the method 1200 includes a number of enumerated aspects, but the method 1200 may include additional aspects before, after, and in between the enumerated aspects. In some aspects, one or more of the enumerated aspects may be omitted or performed in a different order.

At action 1210, the method 1200 includes a first wireless communication device (e.g., the UE 115, the network unit 105, the UE 900, or the network unit 1000) receiving, from a second wireless communication device ((e.g., the UE 115, the network unit 105, the UE 900, or the network unit 1000)) a waveform in a first carrier, wherein the first carrier is between a second carrier and a third carrier. Aspects of the method 1200 may reduce interference of waveforms of a neighboring carrier (e.g., the second carrier and/or the third carrier). The reduction in interference may improve signal processing, increase data throughput, reduce processing requirements, reduce power consumption, improve utilization of network resources, improve network efficiency, and/or combinations thereof. The waveform received at action 1210 of FIG. 12 may include user data, control information, reference signals, signal reports, uplink communications, downlink communications, sidelink communications, and/or any other type of data/communications. In addition, the waveform may occupy any suitable time or frequency resources. In some aspects, the first and second carrier and/or the second and third carrier may be separated in frequency by a guard band (see, e.g., FIG. 5) and/or one or more other carriers.

Additional waveforms may occupy either or both of the second carrier and the third carrier. In some instances, regions of the waveform of the first carrier may overlap into guard bands on either side of the first carrier as well as into the second and/or third carrier. Similarly, regions of a waveform occupying the second carrier and/or the third carrier may overlap into its respective guard bands and/or adjacent carriers, including the first carrier. In some instances, no waveforms may occupy the second or third carriers. In some aspects, the first carrier is part of a shared spectrum. In some aspects, the shared spectrum includes an unlicensed spectrum.

In some aspects, the first carrier is associated with a first radio access technology (RAT) and at least one of the second carrier or the third carrier is associated with a second RAT. The second RAT may be different than the first RAT. In some aspects, the first RAT includes at least one of long-term evolution (LTE) or new radio (NR) and the second RAT includes WiFi. In other examples, any of the first carrier, the second carrier, or the third carrier may be associated with any suitable RAT, including LTE, NR, WiFi, Bluetooth, GSM, UMTS, and/or any other RAT.

In some instances, the wireless communication device may be a UE or a network unit (e.g., a BS, a CU, a DU, an RU, and/or combinations thereof). The wireless communication device may be a UE or network unit of any type, including any of those shown and/or described with reference to FIGS. 1-4, 9, and 10 above.

In some aspects, receiving the waveform may be based on a successful clear channel assessment (CCA) in the shared spectrum and/or the unlicensed spectrum. The clear channel assessment may be performed by a transmitting wireless communication device, including a UE or a network unit, prior to transmitting the waveform that is received at action 1210. In some instances, the receiving wireless communication device may filter the waveform asymmetrically based on the CCA. The CCA may include any suitable LBT protocols, including LBT protocols with or without random back-off with fixed or variable sizes of contention windows, LBT protocols involving frame based equipment (FBE) or load based equipment (LBE), or any other LBT protocols, including CAT2, CAT3, or CAT4.

At action 1220, the method 1200 includes the wireless communication device (e.g., the UE 115, the network unit 105, the UE 900, or the network 1000) filtering the received waveform asymmetrically. Filtering the received waveform asymmetrically may cause interference from the second carrier to be filtered to a greater extent than interference from the third carrier, or vice versa. Aspects of the method 1200 allow a receiving device, such as a UE or network unit, to suppress interference asymmetrically. In some instances, the transmitting wireless communication device may or may not have shaped the waveform (e.g., symmetrically or asymmetrically) before transmitting the waveform to the receiving device. For example, the receiving device may determine, based on the results of a CCA or other diagnosis of signal quality and/or potential interference, whether the signal quality of the received waveform may be improved by asymmetrically filtering the waveform or not. The receiving device may select a side of the waveform (e.g., towards a higher frequency band or a lower frequency band) to prioritize for filtering. In this regard, the receiving device may select the side of the waveform to prioritize for filtering based on the presence of waveforms and/or interference in neighboring carriers. The receiving device may asymmetrically filter the received waveform based on the selected side. In some aspects, the receiving device may filter the received waveform such that selected side (e.g., second carrier) is filtered more aggressively than the opposing, non-selected side (e.g., third carrier).

In some aspects, at action 1220, the wireless communication device may filter the received waveform asymmetrically by applying a complex-valued weighted overlap and add (WOLA) filter. Filtering the waveform with the asymmetrical WOLA filter may suppress interference from waveforms outside the frequency range of the first carrier. For example, the asymmetrical WOLA filter may suppress potential interference from the second carrier and/or the guard band between the first carrier and the second carrier more aggressively than potential interference from the third carrier and/or the guard band between the first carrier and the third carrier (see, e.g., FIG. 5), or vice versa. The degree of suppression/filtering of out-of-band signals may depend on the frequency of the signal and/or the distance of out-of-band signals along the frequency scale from the intended carrier of the waveform (e.g., the first carrier) according to a linear and/or non-linear relationship.

In some aspects, a complex-valued WOLA filter, such as the one applied at action 1220, may define a transition from 0 to 1 and aspects of the WOLA filter may be implemented to suppress out-of-band signals. The calculation or formation of the WOLA filter at action 1220 may involve real or complex values. Aspects of the method 1200 may include generalizing a WOLA filter to 2-dimensional (e.g., complex-valued) pulse shapes. The calculation and/or generation of a WOLA filter may be based on a complex circle pulse. For example, a WOLA filter may be based on a mathematical relationship between attenuation of a signal with the frequency of the signal. In one example, the WOLA filter applied by the wireless communication device, for example at action 1220 of the method 1200, may be based on Equation 1 or Equation 2 presented previously. In some aspects, in selecting the WOLA filter, the 2nd Nyquist criterion may be fulfilled. In this case, rising and falling WOLA slopes can add to unity. In some aspects, inter-carrier interference (ICI) free transmission and/or reception is possible. In some instances (e.g., if power spectral density characteristics are more important than ICI-free OFDM transmission and/or reception), the 2nd Nyquist criterion may be lifted.

In some aspects, in filtering the waveform, the receiving wireless communication device may select a length of the WOLA filter. A smaller WOLA filter length may reduce portions of the cyclic prefix (CP) consumed by the WOLA filter. In this regard, the wireless communication device may select a length of the WOLA filter to achieve a desired interference suppression outcome as well as to limit consumption of the cyclic prefix. In some aspects, selecting the length of the WOLA filter may be based on one or more channel conditions associated with a shared spectrum. In accordance with the present disclosure, an asymmetric WOLA filter may advantageously be a shorter WOLA filter for the same desired transmit or receive PSD characteristics than a symmetric WOLA filter. In some instances, a wireless communication device may re-configure characteristics and/or parameters of a WOLA filter to optimize interference to adjacent sub-channels. This reconfiguration may occur at any time relative to events of transmission or reception. In some aspects, reconfiguration may be based on a CCA outcome or other report or assessment of one or more channel conditions.

At action 1230, the method 1200 includes the receiving wireless communication device (e.g., the UE 115, the network unit 105, the UE 900, or the network unit 1000) processing the asymmetrically shaped waveform to obtain data associated with the waveform. The data associated with the waveform may include any suitable data, including user data, control information, reference signals, signal reports, uplink communications, downlink communications, sidelink communications, and/or any other type of data/communications.

Further aspects of the present disclosure include the following:

Aspect 1 includes a method of wireless communication performed by a wireless communication device, the method comprising: generating a waveform in a first carrier, wherein the first carrier is between a second carrier and a third carrier; shaping the waveform asymmetrically such that the asymmetrically shaped waveform causes less interference with the second carrier than the third carrier; and transmitting the asymmetrically shaped waveform.

Aspect 2 includes the method of aspect 1, wherein the first carrier is part of a shared spectrum.

Aspect 3 includes the method of aspect 2, wherein the shared spectrum includes an unlicensed spectrum.

Aspect 4 includes the method of any of aspects 2-3, further comprising: performing a clear channel assessment (CCA) in the shared spectrum; and wherein the shaping of the waveform asymmetrically is based on the CCA.

Aspect 5 includes the method of any of aspects 1-4, wherein: the first carrier is associated with a first radio access technology (RAT); and at least one of the second carrier or the third carrier is associated with a second RAT, the second RAT being different than the first RAT.

Aspect 6 includes the method of aspect 5, wherein the first RAT includes at least one of long-term evolution (LTE) or new radio (NR) and the second RAT includes WiFi.

Aspect 7 includes the method of any of aspects 1-6, wherein the shaping the waveform asymmetrically includes applying a weighted overlap and add (WOLA) filter.

Aspect 8 includes the method of aspect 7, wherein the WOLA filter includes a complex-valued WOLA filter.

Aspect 9 includes the method of any of aspects 7-8, further comprising selecting a length of the WOLA filter.

Aspect 10 includes the method of aspect 9, wherein the selecting the length of the WOLA filter is based on one or more channel conditions associated with a shared spectrum.

Aspect 11 includes the method of any of aspects 1-10, wherein the wireless communication device includes a user equipment.

Aspect 12 includes the method of any of aspects 1-10, wherein the wireless communication device includes a network unit.

Aspect 13 includes a method of wireless communication performed by a first wireless communication device, the method comprising: receiving, from a second wireless communication device, a waveform in a first carrier, wherein the first carrier is between a second carrier and a third carrier; filtering the received waveform asymmetrically such that interference from the second carrier is filtered to a greater extent than interference from the third carrier; and processing the asymmetrically filtered waveform to obtain data associated with the waveform.

Aspect 14 includes the method of aspect 13, wherein the first carrier is part of a shared spectrum.

Aspect 15 includes the method of aspect 14, wherein the shared spectrum includes an unlicensed spectrum.

Aspect 16 includes the method of any of aspects 14-15, wherein the receiving the waveform is based on a successful clear channel assessment (CCA) in the shared spectrum by the second wireless communication device.

Aspect 17 includes the method of any of aspects 13-16, wherein: the first carrier is associated with a first radio access technology (RAT); and at least one of the second carrier or the third carrier is associated with a second RAT, the second RAT being different than the first RAT.

Aspect 18 includes the method of aspect 17, wherein the first RAT includes at least one of long-term evolution (LTE) or new radio (NR) and the second RAT includes WiFi.

Aspect 19 includes the method of any of aspects 13-18, wherein the filtering the received waveform asymmetrically includes applying a weighted overlap and add (WOLA) filter.

Aspect 20 includes the method of aspect 19, wherein the WOLA filter includes a complex-valued WOLA filter.

Aspect 21 includes the method of any of aspects 19-20, further comprising selecting a length of the WOLA filter.

Aspect 22 includes the method of aspect 21, wherein the selecting the length of the WOLA filter is based on one or more channel conditions associated with a shared spectrum.

Aspect 23 includes the method of any of aspects 13-22, wherein the wireless communication device includes a user equipment.

Aspect 24 includes the method of any of aspects 13-22, wherein the wireless communication device includes a network unit.

Aspect 25 includes a user equipment (UE) comprising one or more means to perform any one or more of aspects 1-10.

Aspect 26 includes a network unit comprising one or more means to perform any one or more of aspects 1-10.

Aspect 27 includes a user equipment (UE) comprising a memory, a transceiver, and at least one processor in communication with the memory and the transceiver, wherein the UE is configured to perform any one or more of aspects 1-10.

Aspect 28 includes a network unit comprising a memory, a transceiver, and at least one processor in communication with the memory and the transceiver, wherein the UE is configured to perform any one or more of aspects 1-10.

Aspect 29 includes a non-transitory computer readable medium having program code stored thereon for operation on a user equipment (UE), the program code comprising code configured to cause the UE to perform any one or more of aspects 1-10.

Aspect 30 includes a non-transitory computer readable medium having program code stored thereon for operation on a network unit, the program code comprising code configured to cause the network unit to perform any one or more of aspects 1-10.

Aspect 31 includes a user equipment (UE) comprising one or more means to perform any one or more of aspects 13-25.

Aspect 32 includes a network unit comprising one or more means to perform any one or more of aspects 13-25.

Aspect 33 includes a user equipment (UE) comprising a memory, a transceiver, and at least one processor in communication with the memory and the transceiver, wherein the UE is configured to perform any one or more of aspects 13-25.

Aspect 34 includes a network unit comprising a memory, a transceiver, and at least one processor in communication with the memory and the transceiver, wherein the UE is configured to perform any one or more of aspects 13-25.

Aspect 35 includes a non-transitory computer readable medium having program code stored thereon for operation on a user equipment (UE), the program code comprising code configured to cause the UE to perform any one or more of aspects 13-25.

Aspect 36 includes a non-transitory computer readable medium having program code stored thereon for operation on a network unit, the program code comprising code configured to cause the network unit to perform any one or more of aspects 13-25.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a wireless communication device, the method comprising:
generating a waveform in a first carrier, wherein the first carrier is between a second carrier and a third carrier;
performing a clear channel assessment (CCA) for the second carrier and the third carrier;
shaping the waveform asymmetrically such that the asymmetrically shaped waveform causes less interference with the second carrier than the third carrier in response to the CCA for the second carrier failing and the CCA for the third carrier being successful; and
transmitting the asymmetrically shaped waveform.

2. The method of claim 1, wherein the first carrier is part of a shared spectrum.

3. The method of claim 2, wherein the shared spectrum includes an unlicensed spectrum, the method further comprising:
performing a CCA in the shared spectrum.

4. The method of claim 1, wherein:
the first carrier and the third carrier are associated with a first radio access technology (RAT);
and the second carrier is associated with a second RAT, the second RAT being different than the first RAT.

5. The method of claim 4, wherein the first RAT includes at least one of long-term evolution (LTE) or new radio (NR) and the second RAT includes WiFi.

6. The method of claim 1, wherein the shaping the waveform asymmetrically includes applying a complex-valued weighted overlap and add (WOLA) filter.

7. The method of claim 6, further comprising selecting a length of the WOLA filter.

8. The method of claim 7, wherein the selecting the length of the WOLA filter is based on one or more channel conditions associated with a shared spectrum.

9. A method of wireless communication performed by a first wireless communication device, the method comprising:
receiving, from a second wireless communication device, a waveform in a first carrier, wherein the first carrier is between a second carrier and a third carrier;
performing a clear channel assessment (CCA) for the second carrier and the third carrier;
filtering the received waveform asymmetrically such that interference from the second carrier is filtered to a greater extent than interference from the third carrier in response to the CCA for the second carrier failing and the CCA for the third carrier being successful; and
processing the asymmetrically filtered waveform to obtain data associated with the waveform.

10. The method of claim 9, wherein the first carrier is part of a shared spectrum.

11. The method of claim 10, wherein the shared spectrum includes an unlicensed spectrum and wherein the receiving the waveform is based on a successful CCA in the shared spectrum by the second wireless communication device.

12. The method of claim 9, wherein:
the first carrier and the third carrier are associated with a first radio access technology (RAT); and
the second carrier is associated with a second RAT, the second RAT being different than the first RAT.

13. The method of claim 12, wherein the first RAT includes at least one of long-term evolution (LTE) or new radio (NR) and the second RAT includes WiFi.

14. The method of claim 9, wherein the filtering the received waveform asymmetrically includes applying a complex-valued weighted overlap and add (WOLA) filter.

15. The method of claim 14, further comprising selecting a length of the WOLA filter.

16. The method of claim 15, wherein the selecting the length of the WOLA filter is based on one or more channel conditions associated with a shared spectrum.

17. A wireless communication device, comprising:
a transceiver; and
a processor in communication with the transceiver, wherein the wireless communication device is configured to:
generate a waveform in a first carrier, wherein the first carrier is between a second carrier and a third carrier;
perform a clear channel assessment (CCA) for the second carrier and the third carrier;
shape the waveform asymmetrically such that the asymmetrically shaped waveform causes less interference with the second carrier than the third carrier in response to the CCA for the second carrier failing and the CCA for the third carrier being successful; and
transmit the asymmetrically shaped waveform.

18. The wireless communication device of claim 17, wherein the first carrier is part of a shared spectrum.

19. The wireless communication device of claim 18, wherein:
the shared spectrum includes an unlicensed spectrum; and
the wireless communication device is further configured to:
perform a CCA in the shared spectrum.

20. The wireless communication device of claim 17, wherein:
the first carrier and the third carrier are associated with a first radio access technology (RAT); and
the second carrier is associated with a second RAT, the second RAT being different than the first RAT.

21. The wireless communication device of claim 20, wherein the first RAT includes at least one of long-term evolution (LTE) or new radio (NR) and the second RAT includes WiFi.

22. The wireless communication device of claim 17, wherein the wireless communication device is further configured to shape the waveform asymmetrically by applying a complex-valued weighted overlap and add (WOLA) filter.

23. The wireless communication device of claim 17, wherein the wireless communication device includes a user equipment.

24. The wireless communication device of claim 17, wherein the wireless communication device includes a network unit.

25. A wireless communication device, comprising:
a transceiver; and a processor in communication with the transceiver, wherein the wireless communication device is configured to:
    receive, from a second wireless communication device, a waveform in a first carrier, wherein the first carrier is between a second carrier and a third carrier;
    performing a clear channel assessment (CCA) for the second carrier and the third carrier;
    filter the received waveform asymmetrically such that interference from the second carrier is filtered to a greater extent than interference from the third carrier in response to the CCA for the second carrier failing and the CCA for the third carrier being successful; and
    process the asymmetrically filtered waveform to obtain data associated with the waveform.

26. The wireless communication device of claim 25, wherein the first carrier is part of an unlicensed spectrum.

27. The wireless communication device of claim 25, wherein:
    the first carrier and the third carrier are associated with a first radio access technology (RAT); and
    the second carrier is associated with a second RAT, the second RAT being different than the first RAT.

28. The wireless communication device of claim 25, wherein the wireless communication device is further configured to filter the received waveform asymmetrically by applying a complex-valued weighted overlap and add (WOLA) filter.

29. The wireless communication device of claim 25, wherein the wireless communication device includes a user equipment.

30. The wireless communication device of claim 25, wherein the wireless communication device includes a network unit.

* * * * *